(12) United States Patent
König et al.

(10) Patent No.: US 9,562,117 B2
(45) Date of Patent: Feb. 7, 2017

(54) PREPARATION OF DERIVATIVES OF ISOBUTENE COPOLYMERS

(75) Inventors: Hannah Maria König, Mannheim (DE); Klaus Mühlbach, Grünstadt (DE); Helmut Mach, Heidelberg (DE); Ulrich Eichenauer, Böhl-Iggelheim (DE)

(73) Assignee: BASF SE, Ludwigshafen (DE)

( * ) Notice: Subject to any disclaimer, the term of this patent is extended or adjusted under 35 U.S.C. 154(b) by 102 days.

(21) Appl. No.: 13/305,132

(22) Filed: Nov. 28, 2011

(65) Prior Publication Data

US 2012/0165473 A1 Jun. 28, 2012

Related U.S. Application Data

(60) Provisional application No. 61/522,326, filed on Aug. 11, 2011, provisional application No. 61/417,899, filed on Nov. 30, 2010.

(51) Int. Cl.
| | | |
|---|---|---|
| *C08F 10/10* | (2006.01) | |
| *C08F 8/32* | (2006.01) | |
| *C08F 8/46* | (2006.01) | |
| *C08F 8/30* | (2006.01) | |
| *C08F 8/14* | (2006.01) | |
| *C08F 290/04* | (2006.01) | |
| *C08F 8/42* | (2006.01) | |

(52) U.S. Cl.
CPC . *C08F 8/30* (2013.01); *C08F 8/14* (2013.01); *C08F 290/042* (2013.01); *C08F 8/32* (2013.01); *C08F 8/42* (2013.01); *C08F 10/10* (2013.01)

(58) Field of Classification Search
CPC ....... C08F 10/10; C08F 110/10; C08F 210/10; C08F 8/14; C08F 8/30; C08F 8/32; C08F 8/46; C08F 290/042; C08F 255/08
USPC ............... 525/260, 263, 267, 268, 301, 302, 304,525/333.7, 379, 381, 382, 386, 384
See application file for complete search history.

(56) References Cited

U.S. PATENT DOCUMENTS

| | | | | |
|---|---|---|---|---|
| 3,215,707 | A * | 11/1965 | Rense ............................ | 548/546 |
| 5,340,881 | A | 8/1994 | Kennedy et al. | |
| 5,408,018 | A | 4/1995 | Rath | |
| 5,445,657 | A | 8/1995 | Durand et al. | |
| 6,451,920 | B1 * | 9/2002 | Harrison et al. ........... | 525/327.4 |
| 6,458,174 | B1 | 10/2002 | Krull et al. | |
| 6,642,329 | B1 * | 11/2003 | Rath ............................. | 526/237 |
| 2005/0107551 | A1 * | 5/2005 | Lang et al. ...................... | 526/82 |
| 2008/0312384 | A1 * | 12/2008 | Bruchmann et al. ......... | 525/449 |
| 2009/0258803 | A1 * | 10/2009 | Harrison ........................ | 508/292 |
| 2011/0201772 | A1 * | 8/2011 | Konig et al. ................... | 526/204 |
| 2011/0230621 | A1 | 9/2011 | Hildebrandt et al. | |

FOREIGN PATENT DOCUMENTS

| | | | |
|---|---|---|---|
| CN | 101955558 A | * | 1/2011 |
| DE | 27 02 604 A1 | | 7/1978 |
| EP | 0 145 235 A1 | | 6/1985 |
| EP | 0 629 641 A1 | | 12/1994 |
| EP | 1 022 293 A2 | | 7/2000 |
| WO | WO 95/07944 | | 3/1995 |
| WO | WO 99/64482 | | 12/1999 |
| WO | WO 2009/129015 A1 | | 10/2009 |
| WO | WO 2010/125035 A1 | | 11/2010 |
| WO | WO 2010/139684 A1 | | 12/2010 |
| WO | WO 2011/054785 A1 | | 5/2011 |
| WO | WO 2011/101281 A1 | | 8/2011 |
| WO | WO 2012/004300 A1 | | 1/2012 |

OTHER PUBLICATIONS

CN 101955558 A, Jan. 2011, machine translation.*
Vasilenko et al., Macromolecules 43 (2010) 5503-5507.*
Liu et al., Polymer 51 (2010) 5960-5969.*
International Search Report and Written Opinion issued Jun. 25, 2012 in PCT/EP2011/071112 filed Nov. 28, 2011 (with English Translation of Categories of Cited Documents).
Qiang Liu, et al., "Polyisobutylene with High exo-Olefin Content via β-H Elimination in the Cationic Polymerization of Isobutylene with $H_2O$/$FeCl_3$/Dialkyl Ether Initiating System", Macromolecules, Bd. 44, Nr. 7, XP055023424, Apr. 2011, pp. 1866-1875.
U.S. Appl. No. 13/535,847, filed Jun. 28, 2012, Roeger-Goepfert, et al.
U.S. Appl. No. 13/568,421, filed Aug. 7, 2012, Koenig, et al.
U.S. Appl. No. 13/655,839, filed Oct. 19, 2012, Koenig, et al.
U.S. Appl. No. 13/503,710, filed Apr. 24, 2012, Koenig, et al.
U.S. Appl. No. 13/305,283, filed Nov. 28, 2011, Köenig, et al.

(Continued)

*Primary Examiner* — Roberto Rabago
(74) *Attorney, Agent, or Firm* — Oblon, McClelland, Maier & Neustadt, L.L.P.

(57) ABSTRACT

A process for producing an isobutene copolymer derivative by: (I) free-radically copolymerizing (a) 10-90 mol % of a monoethylenically unsaturated $C_4$- to $C_{12}$-dicarboxylic acid, anhydride, or ester, (b) 10-90 mol % of a high-reactivity isobutene polymer having $M_n$=110-250000 and obtained by polymerizing isobutene in the presence of an iron-halide-, aluminum trihalide-, or alkylaluminum halide-donor complex, each donor being an ether or carboxylic ester function, or in the presence of a Lewis acid complex containing an organic sulfonic acid, and (c) 0-50 mol % of a monoethylenically unsaturated compound copolymerizable with (a) and (b), to obtain an intermediate isobutene copolymer; and (II) reacting the carboxylic acid functions in the intermediate with at least one of ammonia, an amine, and an alcohol, to form a moiety containing at least one of a hydroxyl, carboxylic ester, amino, quaternized amino, amido, and imido group.

17 Claims, No Drawings

(56) References Cited

OTHER PUBLICATIONS

U.S. Appl. No. 61/417,898, filed Nov. 30, 2010, Koenig, et al.
U.S. Appl. No. 61/522,313, filed Aug. 11, 2011, Koenig, et al.
Edward C. Leonard, "Vinyl and Diene Monomers", John Wiley & Sons, Inc., vol. XXIV, Part 2, 1971, pp. 713-733.
U.S. Appl. No. 14/436,951, filed Apr. 20, 2015, Hansch, et al.

* cited by examiner

PREPARATION OF DERIVATIVES OF ISOBUTENE COPOLYMERS

CROSS-REFERENCES TO RELATED APPLICATIONS

The present application claims priority to U.S. Provisional application Ser. No. 61/417,899, filed Nov. 30, 2010, and U.S. Provisional application Ser. No. 61/522,326, filed Aug. 11, 2011, the entire contents of each of which are hereby incorporated by reference.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF THE MATERIAL ON THE COMPACT DISC

None.

BACKGROUND OF THE INVENTION

Field of the Invention

The present invention relates to an improved process for preparing derivatives of isobutene copolymers. The present invention further relates to novel isobutene copolymer derivatives.

Description of the Related Art Including Information Disclosed Under 37 C.F.R. §§1.97 and 1.98

Isobutene copolymer derivatives are frequently obtained from so-called high-reactivity polyisobutenes. In contrast to so-called low-reactivity polyisobutenes, high-reactivity polyisobutenes are understood to mean those polyisobutenes which comprise a high content of terminal ethylenic double bonds (α-double bonds), specifically in practice of 80 mol % or more, based on the individual chain ends of the polyisobutene macromolecules. Typically, vinylidene groups are understood to mean those double bonds whose position in the polyisobutene macromolecule is described by the general formula

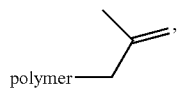

i.e. the double bond is present in an α position in the polymer chain. "Polymer" represents the polyisobutene radical shortened by one isobutene unit. The vinylidene groups exhibit the highest reactivity, for example in the thermal addition onto sterically demanding reactants such as maleic anhydride, whereas a double bond further toward the interior of the macromolecules in most cases exhibits lower reactivity, if any, in functionalization reactions.

The uses of such high-reactivity polyisobutenes include use as intermediates for preparing additives for lubricants and fuels; for example, according to the teaching of DE-A 27 02 604, they are reacted with maleic anhydride to give polyisobutenylsuccinic anhydrides. However, the high-reactivity polyisobutenes obtainable by the process of DE-A 27 02 604 by cationic polymerization of isobutene in the liquid phase in the presence of boron trifluoride as a catalyst have some disadvantages: for example they have a relatively high polydispersity. The polydispersity is a measure of the molecular weight distribution of the resulting polymer chains and corresponds to the quotient of weight-average molecular weight $M_w$ and number-average molecular weight $M_n$ ($PDI=M_w/M_n$).

Polyisobutenes with a similarly high proportion of terminal double bonds but with a narrower molecular weight distribution are, for example, obtainable by the process of EP-A 145 235, U.S. Pat. No. 5,408,018 and WO 99/64482, the polymerization being effected in the presence of a deactivated catalyst, for example of a complex of boron trifluoride with alcohols and/or ethers.

High-reactivity polyisobutenes are also obtainable by living cationic polymerization of isobutene and subsequent dehydrohalogenation of the resulting polymerization product, for example by the process from U.S. Pat. No. 5,340,881. However, such a process is complex since the halogen end group introduced with the living cationic polymerization has to be eliminated in a separate step in order to generate the double bond.

It has additionally been known for some time that the Lewis acid aluminum trichloride can also be used as a polymerization catalyst for isobutene, for example from High Polymers, volume XXIV (part 2), p. 713-733 (editor: Edward C. Leonard), J. Wiley & Sons publishers, New York, 1971.

The European patent application with the reference number 10157068.7, which was yet to be published at the priority date of the present application, describes a process for preparing high-reactivity isobutene homo- or copolymers by polymerization in the presence of an aluminum trihalide-donor complex with is effective as a polymerization catalyst or of an alkyl aluminum halide-donor complex which comprises, as the donor, an organic compound with at least one ether function or a carboxylic ester function, and optionally an organic hydroxyl compound, an organic halogen compound or water as an initiator. Further reactions with the high-reactivity isobutene homo- or copolymers thus prepared are not described therein.

CN 101955558 A discloses that iron(III) chloride is suitable as a coinitiator in the cationic isobutene polymerization for preparation of high-reactivity polyisobutenes and copolymers thereof. The initiators recommended are water, phenols, protic acids such as sulfuric acid, tertiary alcohols, tertiary chlorides, tertiary carboxylic esters and carboxylic acids themselves. The complexing agents mentioned for the systems which initiate the polymerization are especially alkyl ethers.

WO 95/07944 describes copolymers which bear functional groups and are obtainable by free-radical copolymerization of (a) 20 to 60 mol % of at least one monoethenic unsaturated $C_4$- to $C_6$-dicarboxylic acid or anhydride thereof, (b) 10 to 70 mol % of at least one oligomer of propene or of a branched 1-olefin having 4 to 10 carbon atoms, such as isobutene, and a mean molecular weight $M_w$ of 300 to 5000, and (c) 1 to 50 mol % of at least one monoethylenically unsaturated compound which is copolymerizable with monomers (a) and (b), and subsequent functionalization of the copolymer via the anhydride or carboxyl groups with amines. These copolymers are suitable as lubricant and fuel additives.

The preparation methods known from the prior art for derivatives of copolymers based on high-reactivity polyisobutenes, however, have a series of deficiencies. For instance, the content of terminal vinylidene double bonds in the precursor is still too low. The yields in the conversion to the derivatives are in need of improvement. The appearance and the consistency of the derivatives, especially the suppression of discoloration, for example caused by undesired carbonization reactions in the course of thermal stress during derivatization, are still not optimal. Moreover, the physical properties of the derivatives, especially the viscosity behavior at low temperatures, as can occur, for example, in practical use in lubricant oils, and the solubility, especially in polar media, the thermal stability and the storage stability of the derivatives are still in need of improvement. The derivatization processes known from the prior art for isobutene copolymers which proceed from isobutene polymers prepared by means of fluorinated polymerization catalysts have the disadvantage that they trigger corrosion on numerous metallic materials and steel types owing to the residual fluorine content.

BRIEF SUMMARY OF THE INVENTION

It was an object of the present invention, proceeding from high-reactivity polyisobutenes, to provide an improved process for preparing derivatives of isobutene copolymers, which no longer has the deficiencies of the prior art. More particularly, the isobutene copolymer derivatives should be preparable from isobutene polymers with a high content of terminal vinylidene double bonds, especially at least 50 mol %, preferably at least 60 mol %, preferably at least 70 mol %, preferably at least 80 mol %, preferably at least 85 mol %, more preferably at least 90 mol %, and in acceptable yields. In addition, appearance and consistency of the derivatives, for example the color thereof, should be improved. In addition, the physical properties of the derivatives, especially the viscosity behavior at low temperatures, and the solubilities, especially in polar media, the thermal stability and the storage stability of the derivatives should be improved. Any catalyst system used to obtain the isobutene polymers in the precursor should be sufficiently active, have a long life, and be unproblematic in terms of handling and not be susceptible to faults; more particularly, it should be free of fluorine in order to prevent undesired corrosion on metallic materials and steel types caused by residual fluorine content.

BRIEF DESCRIPTION OF THE SEVERAL VIEWS OF THE DRAWINGS

None.

DETAILED DESCRIPTION OF THE INVENTION

The object is achieved by a process for preparing derivatives of isobutene copolymers by free-radically copolymerizing
(a) 10 to 90 mol %, preferably 20 to 60 mol %, especially 20 to 60 mol %, of at least one monoethylenically unsaturated $C_4$- to $C_{12}$-dicarboxylic acid or anhydride thereof or monoester or full ester thereof,
(b) 10 to 90 mol %, preferably 10 to 70 mol %, especially 10 to 70 mol %, of a high-reactivity isobutenehomo- or copolymer having a number-average molecular weight ($M_n$) of 110 to 250 000 and a content of at least 50 mol % of terminal vinylidene double bonds per polyisobutene chain end, which may comprise incorporated structural units formed from mono-, di- or trifunctional initiators,
(c) 0 to 50 mol %, preferably 0 to 50 mol %, especially 1 to 50 mol %, of one or more monoethylenically unsaturated compounds which are copolymerizable with the monomer components (a) and (b), and then reacting some or all of the carboxylic acid or carboxylic acid derivative functions in the resulting isobutene copolymer with ammonia, a mono- or polyamine, an alcohol or a mixture of the reactants mentioned to form moieties with hydroxyl and/or carboxylic ester and/or amino and/or quaternized amino and/or amido and/or imido groups, which comprises obtaining monomer component (b) by polymerizing isobutene or an isobutene-comprising monomer mixture in the presence
(A) of an iron halide-donor complex effective as a polymerization catalyst, of an aluminum trihalide-donor complex or of an alkylaluminum halide-donor complex which comprises, as the donor, an organic compound with at least one ether function or a carboxylic ester function, or
(B) of at least one Lewis acid suitable as a polymerization catalyst or of a complex which is effective as a polymerization catalyst and is formed from at least one Lewis acid and at least one donor, and in the presence of at least one initiator, using as the at least one initiator an organic sulfonic acid of the general formula $Z\text{—}SO_3H$ in which the variable Z denotes a $C_1$- to $C_{20}$-alkyl radical, $C_1$- to $C_{20}$-haloalkyl radical, $C_5$- to $C_8$-cycloalkyl radical, $C_6$- to $C_{20}$-aryl radical or a $C_7$- to $C_{20}$-arylalkyl radical.

The sum of the molar percentages of the monomer components (a), (b) and (c) to be copolymerized with one another is 100% in all cases.

The polymerization method mentioned for isobutene or isobutene-comprising monomer mixtures to obtain monomer component (b) according to embodiment (A), which is essential to this invention, is described in the above-cited European patent application with reference number 10157068.7, which was yet to be published at the priority date of the present application, and is reproduced below.

Isobutene homopolymers are understood in the context of the present invention to mean those polymers which, based on the polymer, are formed from isobutene to an extent of at least 98 mol %, preferably to an extent of at least 99 mol %. Accordingly, isobutene copolymers are understood to mean those polymers which comprise more than 2 mol % of copolymerized monomers other than isobutene, for example linear butenes.

In the context of the present invention, the following definitions apply to generically defined radicals:

A $C_1$- to $C_8$-alkyl radical is a linear or branched alkyl radical having 1 to 8 carbon atoms. Examples thereof are methyl, ethyl, n-propyl, isopropyl, n-butyl, 2-butyl, isobutyl, tert-butyl, pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl and the constitutional isomers thereof, such as 2-ethylhexyl. Such $C_1$- to $C_8$-alkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_1$- to $C_{20}$-alkyl radical is a linear or branched alkyl radical having 1 to 20 carbon atoms. Examples thereof are the abovementioned $C_1$- to $C_8$-alkyl radicals, and additionally n-nonyl, isononyl, n-decyl, 2-propylheptyl, n-undecyl, n-dodecyl, n-tridecyl, isotridecyl, n-tetradecyl, n-hexadecyl, n-octadecyl and n-eicosyl. Such $C_1$- to $C_{20}$-alkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_5$- to $C_8$-cycloalkyl radical is a saturated cyclic radical which may comprise alkyl side chains. Examples thereof are cyclopentyl, 2- or 3-methylcyclopentyl, 2,3-, 2,4- or 2,5-dimethylcyclopentyl, cyclohexyl, 2-, 3- or 4-methylcyclohexyl, 2,3-, 2,4-, 2,5-, 2,6-, 3,4-, 3,5- or 3,6-dimethylcyclohexyl, cycloheptyl, 2-, 3- or 4-methylcycloheptyl, cyclooctyl, 2-, 3-, 4- or 5-methylcyclooctyl. Such $C_5$- to $C_8$-cycloalkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_6$- to $C_{20}$-aryl radical or a $C_6$- to $C_{12}$-aryl radical is preferably optionally substituted phenyl, optionally substituted naphthyl, optionally substituted anthracenyl or optionally substituted phenanthrenyl. Such aryl radicals may be a 1 to 5 aprotic substituents or aprotic functional groups, for example $C_1$- to $C_8$-alkyl, $C_1$- to $C_8$-haloalkyl such as $C_1$- to $C_8$-chloroalkyl or $C_1$- to $C_8$-fluoroalkyl, halogens such as chlorine or fluorine, nitro, cyano or phenyl. Examples of such aryl radicals are phenyl, naphthyl, biphenyl, anthracenyl, phenanthrenyl, tolyl, nitrophenyl, chlorophenyl, dichlorophenyl, pentafluorophenyl, pentachlorophenyl, (trifluoromethyl)phenyl, bis(tri-fluoromethyl)-phenyl, (trichloro)methylphenyl and bis(trichloromethyl)phenyl.

A $C_7$- to $C_{20}$-arylalkyl radical or a $C_1$- to $C_{12}$-arylalkyl radical is preferably optionally substituted $C_1$- to $C_4$-alkylphenyl such as benzyl, o-, m- or p-methylbenzyl, 1- or 2-phenylethyl, 1-, 2- or 3-phenylpropyl or 1-, 2-, 3- or 4-phenylbutyl, optionally substituted $C_1$- to $C_4$-alkylnaphthyl such as naphthylmethyl, optionally substituted $C_1$- to $C_4$-alkylanthracenyl such as anthracenylmethyl, or optionally substituted $C_1$- to $C_4$-alkylphenanthrenyl such as phenanthrenylmethyl. Such arylalkyl radicals may bear 1 to 5 aprotic substituents or aprotic functional groups, especially on the aryl moiety, for example $C_1$- to $C_8$-alkyl, $C_1$- to $C_8$-haloalkyl such as $C_1$- to $C_8$-chloroalkyl or $C_1$- to $C_8$-fluoroalkyl, halogen such as chlorine or fluorine, nitro or phenyl.

Suitable iron halides in the corresponding complexes with donors are, for example, iron(II) fluoride, iron(III) fluoride, iron(II) chloride, iron(III) chloride, iron(II) bromide and iron(III) bromide, and mixtures thereof. Preference is given to using iron chloride, i.e. iron(II) chloride and iron(III) chloride, and mixtures of iron(II) chloride and iron(III) chloride, but especially iron(III) chloride alone. It is also possible to use iron halides, especially iron chlorides, which have been obtained from iron-comprising metal alloys, i.e. in addition to iron halides, especially iron chlorides, also comprise other metal halides, though the iron halides, especially iron chlorides, preferably constitute the main constituents of such mixtures.

A suitable aluminum trihalide is especially aluminum trifluoride, aluminum trichloride or aluminum tribromide. A useful alkylaluminum halide is especially a mono($C_1$- to $C_4$-alkyl)aluminum dihalide or a di($C_1$- to $C_4$-alkyl)aluminum monohalide, for example methylaluminum dichloride, ethylaluminum dichloride, dimethylaluminum chloride or diethylaluminum chloride. In a preferred embodiment, isobutene or an isobutene-comprising monomer mixture is polymerized in the presence of an aluminum trichloride-donor complex effective as a polymerization catalyst.

If the iron halide-donor complex effective as a polymerization catalyst, the aluminum trihalide-donor complex or alkylaluminum halide-donor complex comprises, as the donor, an organic compound with at least one ether function, compounds with at least one ether function are also understood to mean acetals and hemiacetals.

In a preferred embodiment of the present invention, an iron halide-donor complex, an aluminum trihalide-donor complex or an alkylaluminum halide-donor complex, especially an iron chloride-donor complex or an aluminum trichloride-donor complex, is used, which comprises, as the donor, a dihydrocarbyl ether of the general formula $R^1$—O—$R^2$ in which the variables $R^1$ and $R^2$ are each independently $C_1$- to $C_{20}$-alkyl radicals, especially $C_1$- to $C_8$ alkyl radicals, $C_5$- to $C_8$-cycloalkyl radicals, $C_6$— to $C_{20}$-aryl radicals, especially $C_6$- to $C_{12}$ aryl radicals, or $C_7$- to $C_{20}$-arylalkyl radicals, especially $C_7$- to $C_{12}$-arylalkyl radicals.

The dihydrocarbyl ethers mentioned may be open-chain or cyclic, where the two variables $R^1$ and $R^2$ in the case of the cyclic ethers may join to form a ring, where such rings may also comprise two or three ether oxygen atoms. Examples of such open-chain and cyclic dihydrocarbyl ethers are dimethyl ether, diethyl ether, di-n-propyl ether, diisopropyl ether, di-n-butyl ether, di-sec-butyl ether, diisobutyl ether, di-n-pentyl ether, di-n-hexyl ether, di-n-heptyl ether, di-n-octyl ether, di-(2-ethylhexyl)ether, methyl n-butyl ether, methyl sec-butyl ether, methyl isobutyl ether, methyl tert-butyl ether, ethyl n-butyl ether, ethyl sec-butyl ether, ethyl isobutyl ether, n-propyl-n-butyl ether, n-propyl sec-butyl ether, n-propyl isobutyl ether, n-propyl tert-butyl ether, isopropyl n-butyl ether, isopropyl sec-butyl ether, isopropyl isobutyl ether, isopropyl tert-butyl ether, methyl n-hexyl ether, methyl n-octyl ether, methyl 2-ethylhexyl ether, ethyl n-hexyl ether, ethyl n-octyl ether, ethyl 2-ethylhexyl ether, n-butyl n-octyl ether, n-butyl 2-ethylhexyl ether, tetrahydrofuran, tetrahydropyran, 1,2-, 1,3- and 1,4-dioxane, dicyclohexyl ether, diphenyl ether, ditolyl ether, dixylyl ether and dibenzyl ether. Among the dihydrocarbyl ethers mentioned, di-n-butyl ether and diphenyl ether have been found to be particularly advantageous as donors for the iron halide-donor complexes, the aluminum trihalide-donor complexes or the alkylaluminum halide-donor complexes, especially the iron chloride-donor complexes or the aluminum trichloride-donor complexes.

In a further preferred embodiment of the present invention, as an alternative, an iron halide-donor complex, an aluminum trihalide-donor complex or an alkylaluminum halide-donor complex, especially an iron chloride-donor complex or an aluminum trichloride-donor complex, is used, which comprises, as the donor, a hydrocarbyl carboxylate of the general formula $R^3$—$COOR^4$ in which the variables $R^3$ and $R^4$ are each independently $C_1$- to $C_{20}$-alkyl radicals, especially $C_1$- to $C_8$ alkyl radicals, $C_5$- to $C_8$-cycloalkyl radicals, $C_6$- to $C_{20}$-aryl radicals, especially $C_6$- to $C_{12}$ aryl radicals, or $C_7$- to $C_{20}$-arylalkyl radicals, especially $C_7$- to $C_{12}$-arylalkyl radicals.

Examples of the hydrocarbyl carboxylates mentioned are methyl formate, ethyl formate, n-propyl formate, isopropyl formate, n-butyl formate, sec-butyl formate, isobutyl formate, tert-butyl formate, methyl acetate, ethyl acetate, n-propyl acetate, isopropyl acetate, n-butyl acetate, sec-butyl acetate, isobutyl acetate, tert-butyl acetate, methyl propionate, ethyl propionate, n-propyl propionate, isopropyl propionate, n-butyl propionate, sec-butyl propionate, isobutyl propionate, tert-butyl propionate, methyl butyrate, ethyl butyrate, n-propyl butyrate, isopropyl butyrate, n-butyl butyrate, sec-butyl butyrate, isobutyl butyrate, tert-butyl butyrate, methyl cyclohexanecarboxylate, ethyl cyclohexanecarboxylate, n-propyl cyclohexanecarboxylate, isopropyl cyclohexanecarboxylate, n-butyl cyclohexanecarboxylate, sec-butyl cyclohexanecarboxylate, isobutyl cyclohexanecarboxylate, tert-butyl cyclohexanecarboxylate, methyl benzoate, ethyl benzoate, n-propyl benzoate, isopropyl benzoate, n-butyl benzoate, sec-butyl benzoate, isobutyl benzoate, tert-butyl benzoate, methyl phenylacetate, ethyl phenylacetate, n-propyl phenylacetate, isopropyl phenylacetate, n-butyl phenylacetate, sec-butyl phenylacetate, isobutyl phenylacetate and tert-butyl phenylacetate. Among the hydrocarbyl carboxylates mentioned, ethyl acetate has been found to be particularly advantageous as a donor for the iron halide-donor complexes, the aluminum trihalide-donor complexes or the alkylaluminum halide-donor complexes, especially the iron chloride-donor complexes or the aluminum trichloride-donor complexes.

In addition, particularly advantageous dihydrocarbyl ethers and hydrocarbyl carboxylates as donors for the iron halide-donor complexes, the aluminum trihalide-donor complexes or the alkylaluminum halide-donor complexes, especially the iron chloride-donor complexes or the aluminum trichloride-donor complexes, have been found to be those in which the donor compound has a total carbon number of 3 to 16, preferably of 4 to 16, especially of 4 to 12, in particular of 4 to 8. In the specific case of the dihydrocarbyl ethers, preference is given in particular to those having a total of 6 to 14 and especially 8 to 12 carbon atoms. In the specific case of the hydrocarbyl carboxylates, preference is given in particular to those having a total of 3 to 10 and especially 4 to 6 carbon atoms.

The molar ratio of the donor compounds mentioned to the iron halide, to the aluminum trihalide or to the alkylaluminum halide, especially to the iron chloride or to the aluminum trichloride, in the donor complex generally varies within the range from 0.3:1 to 1.5:1, especially from 0.5:1 to 1.2:1, in particular 0.7:1 to 1.1:1; in most cases it is 1:1. However, it is also possible to work with a greater excess of the donor compounds, often up to a 10-fold and especially 3-fold molar excess; the excess amount of donor compounds then acts additionally as a solvent or diluent.

Typically, the iron halide-donor complex, the aluminum trihalide-donor complex or the alkylaluminum halide-donor complex, especially the iron chloride-donor complex or the aluminum trichloride-donor complex, is prepared separately prior to the polymerization from the iron halide, the aluminum trihalide or the alkylaluminum halide, especially from anhydrous iron chloride or aluminum trichloride, and the donor compound, and is then—usually dissolved in an inert solvent such as a halogenated hydrocarbon, for example dichloromethane—added to the polymerization medium. However, the complex can also be prepared in situ prior to the polymerization.

In a preferred embodiment of the present invention, the polymerization is performed with additional use of a mono- or polyfunctional, especially mono-, di- or trifunctional, initiator which is selected from organic hydroxyl compounds, organic halogen compounds, protic acids and water. It is also possible to use mixtures of the initiators mentioned, for example mixtures of two or more organic hydroxyl compounds, mixtures of two or more organic halogen compounds, mixtures of one or more organic hydroxyl compounds and one or more organic halogen compounds, mixtures of one or more organic hydroxyl compounds and water, mixtures of one or more organic halogen compounds and water or mixtures of one or more protic acids and water. The initiator may be mono-, di- or polyfunctional, i.e. one, two or more hydroxyl groups or halogen atoms, which start the polymerization reaction, may be present in the initiator molecule. In the case of di- or polyfunctional initiators, telechelic isobutene polymers with two or more, especially two or three, polyisobutene chain ends are typically obtained.

Organic hydroxyl compounds which have only one hydroxyl group in the molecule and are suitable as monofunctional initiators include especially alcohols and phenols, in particular those of the general formula $R^5$—OH, in which $R^5$ denotes $C_1$- to $C_{20}$-alkyl radicals, especially $C_1$- to $C_8$-alkyl radicals, $C_5$ to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. In addition, the $R^5$ radicals may also comprise mixtures of the abovementioned structures and/or have other functional groups than those already mentioned, for example a keto function, a nitroxide or a carboxyl group, and/or heterocyclic structural elements.

Typical examples of such organic monohydroxyl compounds are methanol, ethanol, n-propanol, isopropanol, n-butanol, sec-butanol, isobutanol, tert-butanol, n-pentanol, n-hexanol, n-heptanol, n-octanol, 2-ethylhexanol, cyclohexanol, phenol, p-methoxy-phenol, o-, m- and p-cresol, benzyl alcohol, p-methoxybenzyl alcohol, 1- and 2-phenylethanol, 1- and 2-(p-methoxyphenyl)ethanol, 1-, 2- and 3-phenyl-1-propanol, 1-, 2- and 3-(p-methoxyphenyl)-1-propanol, 1- and 2-phenyl-2-propanol, 1- and 2-(p-methoxyphenyl)-2-propanol, 1-, 2-, 3- and 4-phenyl-1-butanol, 1-, 2-, 3- and 4-(p-methoxy-phenyl)-1-butanol, 1-, 2-, 3- and 4-phenyl-2-butanol, 1-, 2-, 3- and 4-(p-methoxy-phenyl)-2-butanol, 9-methyl-9H-fluoren-9-ol, 1,1-diphenylethanol, 1,1-diphenyl-2-propyn-1-ol, 1,1-diphenylpropanol, 4-(1-hydroxy-1-phenylethyl)benzonitrile, cyclopropyldiphenylmethanol, 1-hydroxy-1,1-diphenylpropan-2-one, benzilic acid, 9-phenyl-9-fluorenol, triphenylmethanol, diphenyl(4-pyridinyl)methanol, alpha,alpha-diphenyl-2-pyridinemethanol, 4-methoxytrityl alcohol (especially polymer-bound as a solid phase), alpha-tert-butyl-4-chloro-4'-methylbenzhydrol, cyclohexyldiphenyl-methanol, alpha-(p-tolyl)-benzhydrol, 1,1,2-triphenylethanol, alpha,alpha-diphenyl-2-pyridineethanol, alpha,alpha-4-pyridylbenzhydrol N-oxide, 2-fluorotriphenylmethanol, triphenylpropargyl alcohol, 4-[(diphenyl)hydroxymethyl]benzonitrile, 1-(2,6-dimethoxyphenyl)-2-methyl-1-phenyl-1-propanol, 1,1,2-triphenylpropan-1-ol and p-anisaldehyde carbinol.

Organic hydroxyl compounds which have two hydroxyl groups in the molecule and are suitable as bifunctional initiators are especially dihydric alcohols or diols having a total carbon number of 2 to 30, especially of 3 to 24, in particular of 4 to 20, and bisphenols having a total carbon number of 6 to 30, especially of 8 to 24, in particular of 10 to 20, for example ethylene glycol, 1,2- and 1,3-propylene glycol, 1,4-butylene glycol, 1,6-hexylene glycol, 1,2-, 1,3- or 1,4-bis(1-hydroxy-1-methylethyl)benzene (o-, m- or p-dicumyl alcohol), bisphenol A, 9,10-di-hydro-9,10-dimethyl-9,10-anthracenediol, 1,1-diphenylbutane-1,4-diol, 2-hydroxytriphenylcarbinol and 9-[2-(hydroxymethyl)phenyl]-9-fluorenol.

Organic halogen compounds which have one halogen atom in the molecule and are suitable as monofunctional initiators are in particular compounds of the general formula $R^6$-Hal in which Hal is a halogen atom selected from fluorine, iodine and especially chlorine and bromine, and $R^6$ denotes $C_1$- to $C_{20}$-alkyl radicals, especially $C_1$- to $C_6$-alkyl radicals, $C_5$- to $C_8$-cycloalkyl radicals or $C_7$- to $C_{20}$-arylalkyl radicals, especially $C_7$- to $C_{12}$-arylalkyl radicals. In addition, the $R^6$ radicals may also comprise mixtures of the abovementioned structures and/or have other functional groups than those already mentioned, for example a keto function, a nitroxide or a carboxyl group, and/or heterocyclic structural elements.

Typical examples of such monohalogen compounds are methyl chloride, methyl bromide, ethyl chloride, ethyl bromide, 1-chloropropane, 1-bromopropane, 2-chloropropane, 2-bromopropane, 1-chlorobutane, 1-bromobutane, sec-butyl chloride, sec-butyl bromide, isobutyl chloride, isobutyl bromide, tert-butyl chloride, tert-butyl bromide, 1-chloropentane, 1-bromopentane, 1-chlorohexane, 1-bromohexane, 1-chloroheptane, 1-bromoheptane, 1-chlorooctane, 1-bromooctane, 1-chloro-2-ethylhexane, 1-bromo-2-ethylhexane, cyclohexyl chloride, cyclohexyl bromide, benzyl chloride, benzyl bromide, 1-phenyl-1-chloroethane, 1-phenyl-1-bromoethane, 1-phenyl-2-chloroethane, 1-phenyl-2-bromoethane, 1-phenyl-1-chloropropane, 1-phenyl-1-bromopropane, 1-phenyl-2-chloropropane, 1-phenyl-2-bromopropane, 2-phenyl-2-chloropropane, 2-phenyl-2-bromopropane, 1-phenyl-3-chloropropane, 1-phenyl-3-bromopropane, 1-phenyl-1-chlorobutane, 1-phenyl-1-bromobutane, 1-phenyl-2-chlorobutane, 1-phenyl-2-bromobutane, 1-phenyl-3-chlorobutane, 1-phenyl-3-bromobutane, 1-phenyl-4-chlorobutane, 1-phenyl-4-bromobutane, 2-phenyl-1-chlorobutane, 2-phenyl-1-bromobutane, 2-phenyl-2-chlorobutane, 2-phenyl-2-bromobutane, 2-phenyl-3-chlorobutane, 2-phenyl-3-bromobutane, 2-phenyl-4-chlorobutane and 2-phenyl-4-bromobutane.

Organic halogen compounds which have two halogen atoms in the molecule and are suitable as difunctional initiators are, for example, 1,3-bis(1-bromo-1-methylethyl)benzene, 1,3-bis(2-chloro-2-propyl)benzene (1,3-dicumyl chloride) and 1,4-bis(2-chloro-2-propyl)benzene (1,4-dicumyl chloride).

The initiator is more preferably selected from organic hydroxyl compounds in which one or more hydroxyl groups are each bonded to an $sp^3$-hybridized carbon atom ("alcohols") or to an aromatic ring ("phenols"), organic halogen compounds, in which one or more halogen atoms are each bonded to an $sp^3$-hybridized carbon atom, protonic acids and water. Among these, preference is given in particular to an initiator selected from organic hydroxyl compounds in which one or more hydroxyl groups are each bonded to an $sp^3$-hybridized carbon atom.

In the case of the organic halogen compounds as initiators, particular preference is further given to those in which the one or more halogen atoms are each bonded to a secondary or especially to a tertiary $sp^3$-hybridized carbon atom.

Preference is given in particular to initiators which bear, on such an $sp^3$-hydridized carbon atom, in addition to the hydroxyl group, the $R^{10}$, $R^{11}$ and $R^{12}$ radicals, which are each independently hydrogen, $C_1$- to $C_{20}$-alkyl, $C_5$- to $C_8$-cycloalkyl, $C_6$- to $C_{20}$-aryl, $C_7$- to $C_{20}$-alkylaryl or phenyl, where any aromatic ring may also bear one or more, preferably one or two, $C_1$- to $C_4$-alkyl, $C_1$- to $C_4$-alkoxy, $C_1$- to $C_4$-hydroxyalkyl or $C_1$- to $C_4$-haloalkyl radicals as substituents, where not more than one of the variables $R^{10}$, $R^{11}$ and $R^{12}$ is hydrogen and at least one of the variables $R^{10}$, $R^{11}$ and $R^{12}$ is phenyl which may also bear one or more, preferably one or two, $C_1$- to $C_4$-alkyl, $C_1$- to $C_4$-alkoxy, $C_1$- to $C_1$-hydroxyalkyl or $C_1$- to $C_4$-haloalkyl radicals as substituents.

Examples of useful protic acids include hydrochloric acid, hydrobromic acid, hydrofluoric acid, sulfuric acid, hydrocyanic acid and mixtures thereof. However, the protic acids used may also be protonated ethers.

For the present invention, very particular preference is given to initiators selected from water, one or more protic acids, methanol, ethanol, 1-phenylethanol, 1-(p-methoxyphenyl)ethanol, n-propanol, isopropanol, 2-phenyl-2-propanol (cumene), n-butanol, isobutanol, sec-butanol, tert-butanol, 1-phenyl-1-chloroethane, 2-phenyl-2-chloropropane (cumyl chloride), tert-butyl chloride and 1,3- or 1,4-bis(1-hydroxy-1-methylethyl)benzene, and mixtures thereof. Among these, preference is given in particular to initiators selected from water, one or more protic acids, methanol, ethanol, 1-phenylethanol, 1-(p-methoxy-phenyl)ethanol, n-propanol, isopropanol, 2-phenyl-2-propanol (cumene), n-butanol, isobutanol, sec-butanol, tert-butano-1,1-phenyl-1-chloroethane and 1,3- or 1,4-bis(1-hydroxy-1-methylethyl)benzene, and mixtures thereof.

According to embodiment (A), the molar ratio of the initiators mentioned to the isobutene monomer used in the case of homopolymerization of isobutene, or to the total amount of the polymerizable monomers used in the case of copolymerization of isobutene, based on each individual functional site of the initiator, is generally 0.0005:1 to 0.1:1, especially 0.001:1 to 0.075:1, in particular 0.0025:1 to 0.05:1. When water is used as the sole initiator or in combination with organic hydroxyl compounds and/or organic halogen compounds as further initiators, the molar ratio of water to the isobutene monomer used in the case of homopolymerization of isobutene, or to the total amount of the polymerizable monomers used in the case of copolymerization of isobutene is especially 0.0001:1 to 0.1:1, in particular 0.0002:1 to 0.05:1.

According to embodiment (A), a proportion of the initiator molecules added as organic hydroxyl or halogen compounds is incorporated into the polymer chains. The proportion ($I_{eff}$) of polymer chains which are started by such an incorporated organic initiator molecule may be up to 100%, and is generally 5 to 90%. The remaining polymer chains arise either from water originating from traces of moisture as an initiator molecule, or from chain transfer reactions.

In a further preferred embodiment of the present invention, the polymerization is performed in the presence of 0.01 to 10 mmol, especially of 0.05 to 5.0 mmol, in particular of 0.1 to 1.0 mmol, based in each case on 1 mol of isobutene monomer used in the case of homopolymerization of isobutene, or on 1 mol of the total amount of the polymerizable monomers used in the case of copolymerization of isobutene, of a basic nitrogen compound.

Such a basic nitrogen compound used may be an aliphatic, cycloaliphatic or aromatic amine of the general formula $R^7$—$NR^8R^9$, or else ammonia, in which the variables $R^7$, $R^8$ and $R^9$ are each independently hydrogen, $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. When none of these variables is hydrogen, the amine is a tertiary amine. When one of these variables is hydrogen, the amine is a secondary amine. When two of these variables is hydrogen, the amine is a primary amine. When all these variables are hydrogen, the amine is ammonia.

Typical examples of such amines of the general formula $R^7$—$NR^8R^9$ are methylamine, ethylamine, n-propylamine, isopropylamine, n-butylamine, tert-butylamine, sec-butylamine, isobutylamine, tert-amylamine, n-hexylamine, n-heptylamine, n-octylamine, 2-ethylhexylamine, cyclopentylamine, cyclohexylamine, aniline, dimethylamine, diethylamine, di-n-propylamine, diisopropylamine, di-n-butylamine, di-tert-butylamine, di-sec-butylamine, diisobutylamine, di-tert-amylamine, di-n-hexylamine, di-n-heptylamine, di-n-octylamine, di-(2-ethylhexyl)amine, dicyclopentylamine, dicyclohexylamine, diphenylamine, trimethylamine, triethylamine, tri-n-propylamine, tri-isopropylamine, tri-n-butylamine, tri-tert-butylamine, tri-sec-butylamine, tri-isobutylamine, tri-tert-amylamine, tri-n-hexylamine, tri-n-heptylamine, tri-n-octylamine, tri-(2-ethylhexyl)amine, tricyclopentylamine, tricyclohexylamine, triphenylamine, dimethylethylamine, methyl-n-butylamine, N-methyl-N-phenylamine, N,N-dimethyl-N-phenylamine, N-methyl-N,N-diphenylamine or N-methyl-N-ethyl-N-n-butylamine.

In addition, such a basic nitrogen compound used may also be a compound having a plurality of, especially having two or three, nitrogen atoms and having 2 to 20 carbon atoms, where these nitrogens may each independently bear hydrogen atoms or aliphatic, cycloaliphatic or aromatic substituents. Examples of such polyamines are 1,2-ethylenediamine, 1,3-propylenediamine, 1,4-butylenediamine, diethylenetriamine, N-methyl-1,2-ethylenediamine, N,N-dimethyl-1,2-ethylenediamine, N,N'-dimethyl-1,2-ethylenediamine or N,N-dimethyl-1,3-propylenediamine.

However, a suitable basic nitrogen compound of this kind is especially a saturated, partly unsaturated or unsaturated nitrogen-containing five-membered or six-membered heterocyclic ring which comprises one, two or three ring nitrogen atoms and may have one or two further ring heteroatoms from the group of oxygen and sulfur and/or hydrocarbyl radicals, especially $C_1$- to $C_4$-alkyl radicals and/or phenyl, and/or functional groups or heteroatoms as substituents, especially fluorine, chlorine, bromine, nitro and/or cyano, for example pyrrolidine, pyrrole, imidazole, 1,2,3- or 1,2,4-triazole, oxazole, thiazole, piperidine, pyrazane, pyrazole, pyridazine, pyrimidine, pyrazine, 1,2,3-, 1,2,4- or 1,2,5-triazine, 1,2,5-oxathiazine, 2H-1,3,5-thiadiazine or morpholine.

However, a very particularly suitable basic nitrogen compound of this kind is pyridine or a derivative of pyridine (especially a mono-, di- or tri-$C_1$- to $C_4$-alkyl-substituted pyridine) such as 2-, 3-, or 4-methylpyridine (picolines), 2,3-, 2,4-, 2,5-, 2,6-, 3,4-, 3,5- or 3,6-dimethylpyridine (lutidines), 2,4,6-trimethylpyridine (collidine), 2-, 3,- or 4-tert-butylpyridine, 2-tert-butyl-6-methylpyridine, 2,4-, 2,5-, 2,6- or 3,5-di-tert-butylpyridine or else 2-, 3,- or 4-phenylpyridine.

It is possible to use a single basic nitrogen compound or mixtures of such basic nitrogen compounds.

The polymerization method essential to the invention, which has been specified for the present invention, for isobutene or isobutene-comprising monomer mixtures according to embodiment (B) is described hereinafter.

Isobutene homopolymers are understood in the context of the present invention to mean those polymers which, based on the polymer, are formed from isobutene to an extent of at least 98 mol %, preferably to an extent of at least 99 mol %. Accordingly, isobutene copolymers are understood to mean those polymers which comprise more than 2 mol % of copolymerized monomers other than isobutene, for example linear butene.

In the context of the present invention, the following definitions apply to generically defined radicals:

A $C_1$- to $C_8$-alkyl radical is a linear or branched alkyl radical having 1 to 8 carbon atoms. Examples thereof are methyl, ethyl, n-propyl, isopropyl, n-butyl, 2-butyl, isobutyl, tert-butyl, pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl and the constitutional isomers thereof, such as 2-ethylhexyl. Such $C_1$- to $C_8$-alkyl radicals may to a small extent also comprise heteroatoms such as oxygen, nitrogen or halogen atoms, for example chlorine or fluorine, and/or aprotic functional groups, for example carboxyl ester groups, cyano groups or nitro groups.

A $C_1$- to $C_{20}$-alkyl radical is a linear or branched alkyl radical having 1 to 20 carbon atoms. Examples thereof are the abovementioned $C_1$- to $C_8$-alkyl radicals, and additionally n-nonyl, isononyl, n-decyl, 2-propylheptyl, n-undecyl, n-dodecyl, n-tridecyl, isotridecyl, n-tetradecyl, n-hexadecyl, n-octadecyl and n-eicosyl. Such $C_1$- to $C_{20}$-alkyl radicals may to a small extent also comprise heteroatoms such as oxygen, nitrogen or halogen atoms, for example chlorine or fluorine, and/or aprotic functional groups, for example carboxyl ester groups, cyano groups or nitro groups.

A $C_1$- to $C_{20}$-haloalkyl radical or a $C_1$- to $C_8$-haloalkyl radical is a radical with the base skeletons specified above for $C_1$- to $C_{20}$-alkyl radicals or $C_1$- to $C_8$-alkyl radicals, but in which the hydrogen atoms have been replaced to a relatively high degree by halogen atoms, especially by fluorine and/or chlorine atoms. Preferably all or virtually all hydrogen atoms have been replaced by halogen atoms, especially by fluorine and/or chlorine atoms. Typical examples of such radicals are $C_1$- to $C_4$-alkyl radicals in which at least 60%, especially at least 75%, in particular at least 90%, of the number of the hydrogen atoms have been replaced by fluorine and/or chlorine atoms, for example dichloromethyl, trichloromethyl, difluoromethyl, trifluoromethyl, chlorodifluoromethyl, fluorodichloromethyl, pentachloroethyl or pentafluoroethyl.

A $C_5$- to $C_8$-cycloalkyl radical is a saturated cyclic radical which may comprise alkyl side chains. Examples thereof are cyclopentyl, 2- or 3-methylcyclopentyl, 2,3-, 2,4- or 2,5-dimethylcyclopentyl, cyclohexyl, 2-, 3- or 4-methylcyclohexyl, 2,3-, 2,4-, 2,5-, 2,6-, 3,4-, 3,5- or 3,6-dimethylcyclohexyl, cycloheptyl, 2-, 3- or 4-methylcycloheptyl, cyclooctyl, 2-, 3-, 4- or 5-methylcyclooctyl. Such $C_5$- to $C_8$-cycloalkyl radicals may to a small extent also comprise heteroatoms such as oxygen, nitrogen or halogen atoms, for example chlorine or fluorine, and/or aprotic functional groups, for example carboxyl ester groups, cyano groups or nitro groups.

A $C_6$- to $C_{20}$-aryl radical or a $C_6$- to $C_{12}$-aryl radical is preferably optionally substituted phenyl, optionally substituted naphthyl, optionally substituted anthracenyl or optionally substituted phenanthrenyl. Such aryl radicals may bear 1 to 5 aprotic substituents or aprotic functional groups, for example $C_1$- to $C_8$-alkyl, $C_1$- to $C_8$-haloalkyl such as $C_1$- to $C_8$-chloroalkyl or $C_1$- to $C_8$-fluoroalkyl, halogens such as chlorine or fluorine, nitro, cyano or phenyl. Examples of such aryl radicals are phenyl, naphthyl, biphenyl, anthracenyl, phenanthrenyl, tolyl, nitrophenyl, chlorophenyl, dichlorophenyl, pentafluorophenyl, pentachlorophenyl, (trifluoromethyl)phenyl, bis(tri-fluoromethyl)-phenyl, (trichloro)methylphenyl and bis(trichloromethyl)phenyl.

A $C_7$- to $C_{20}$-arylalkyl radical or a $C_7$- to $C_{12}$-arylalkyl radical is preferably optionally substituted $C_1$- to $C_4$-alkylphenyl such as benzyl, o-, m- or p-methylbenzyl, 1- or 2-phenylethyl, 1-, 2- or 3-phenylpropyl or 1-, 2-, 3- or 4-phenylbutyl, optionally substituted $C_1$- to $C_4$-alkylnaphthyl such as naphthylmethyl, optionally substituted $C_1$- to $C_4$-alkylanthracenyl such as anthracenylmethyl, or optionally substituted $C_1$- to $C_4$-alkylphenanthrenyl such as phenanthrenylmethyl. Such arylalkyl radicals may bear 1 to 5 aprotic substituents or aprotic functional groups, especially on the aryl moiety, for example $C_1$- to $C_8$-alkyl, $C_1$- to $C_8$-haloalkyl such as $C_1$- to $C_8$-chloroalkyl or $C_1$- to $C_8$-fluoroalkyl, halogen such as chlorine or fluorine, nitro or phenyl.

The process according to the invention for preparation of high-reactivity isobutene homo- or copolymers generally proceeds—caused by the use of the complex which is effective as a polymerization catalyst and is formed from at least one Lewis acid and optionally at least one donor and the initiators described—by a cationic reaction mechanism.

The feature essential to the invention is the use of an organic sulfonic acid of the general formula $Z—SO_3H$ as at least one initiator in the polymerization process according to the invention. It will be appreciated that it is also possible to use mixtures of different sulfonic acids $Z—SO_3H$. In addition to these sulfonic acid initiators, it is also possible to use further initiator molecules from other chemical substance classes.

The variable Z preferably represents a $C_1$- to $C_8$-alkyl radical, $C_1$- to $C_8$-haloalkyl radical, $C_5$- to $C_8$-cycloalkyl radical, $C_6$- to $C_{12}$-aryl radical or a $C_7$- to $C_{12}$-arylalkyl radical. Z more preferably represents a $C_1$- to $C_4$-alkyl radical, a $C_1$- to $C_4$-haloalkyl radical, an optionally substituted phenyl radical, e.g. a tolyl radical or a xylyl radical, or an optionally substituted $C_1$- to $C_4$-alkylphenyl radical, e.g. a benzyl radical.

In a particularly preferred embodiment of the present invention, the at least one initiator used is an organic sulfonic acid selected from methanesulfonic acid, trifluoromethanesulfonic acid, trichloromethanesulfonic acid and toluenesulfonic acid, or mixtures thereof.

Suitable Lewis acids as a polymerization catalyst or in the complex effective as a polymerization catalyst are in principle all inorganic molecules identified as Lewis acids by definition, but especially halogen compounds of metals and semi metals of the Periodic Table of the Elements whose valences are fully satisfied by halogen atoms or which, in addition to the halogen substituents, also bear one or more organic carbon radicals—especially $C_1$- to $C_4$-alkyl radicals. Useful halogen substituents in these element halides and alkyl element halides here include iodine, bromine and especially fluorine and in particular chlorine. It is of course also possible to use mixtures of those element halides or of those alkyl element halides with one another in each case and also with each other.

If, for example, the halides or alkyl halides of aluminum are used as such Lewis acids, the following species can typically be used: aluminum trifluoride, aluminum trichloride, aluminum tribromide; as alkylaluminum halides, mono ($C_1$- to $C_4$-alkyl)aluminum dihalides or di($C_1$- to $C_4$-alkyl) aluminum monohalide such as methylaluminum dichloride, ethylaluminum dichloride, dimethylaluminum chloride or diethylaluminum chloride.

In a preferred embodiment, the Lewis acid used for the polymerization catalyst or the complex effective as a polymerization catalyst is at least one compound selected from the binary chlorine and fluorine compounds of the elements of transition groups 1 to 8 and of main groups 3 to 5 of the Periodic Table, and the binary chlorine compounds may be preferable over the binary fluorine compounds of these elements.

Typical binary chlorine compounds of this kind are $ScCl_3$, $YCl_3$, $YbCl_3$, $TiCl_3$, $TiCl_4$, $ZrCl_4$, $HfCl_4$, $VCl_3$, $VCl_4$, $NbCl_3$, $NbCl_5$, $TaCl_5$, $CrCl_2$, $CrCl_3$, $MoCl_3$, $MoCl_5$, $WCl_5$, $WCl_6$, $MnCl_2$, $ReCl_3$, $ReCl_5$, $FeCl_2$, $FeCl_3$, $RuCl_3$, $OsCl_3$, $CoCl_2$, $CoCl_3$, $RhCl_3$, $IrCl_3$, $NiCl_2$, $PdCl_2$, $PtCl_2$, $CuCl$, $CuCl_2$, $AgCl$, $AuCl$, $ZnCl_2$, $CdCl_2$, $HgCl$, $HgCl_2$, $BCl_3$, $AlCl_3$, $GaCl_3$, $InCl_3$, $TlCl_3$, $SiCl_4$, $GeCl_4$, $SnCl_2$, $SnCl_3$, $SnCl_4$, $PbCl_2$, $PbCl_4$, $PCl_3$, $PCl_5$, $AsCl_3$, $SbCl_3$, $SbCl_5$ and $BiCl_3$. Particular preference among these is given to $BCl_3$, $AlCl_3$, $TiCl_4$, $FeCl_2$, $FeCl_3$ and $ZnCl_2$.

Typical binary fluorine compounds of this kind are $ScF_3$, $YF_3$, $YbF_3$, $TiF_3$, $TiF_4$, $ZrF_4$, $HfF_4$, $VF_3$, $VF_4$, $NbF_3$, $NbF_5$, $TaF_5$, $CrF_2$, $CrF_3$, $MoF_3$, $MoF_5$, $WF_5$, $WF_6$, $MnF_2$, $ReF_3$, $ReF_5$, $FeF_2$, $FeF_3$, $RuF_3$, $OsF_3$, $CoF_2$, $CoF_3$, $RhF_3$, $IrF_3$, $NiF_2$, $PdF_2$, $PtF_2$, $CuF$, $CuF_2$, $AgF$, $AuF$, $ZnF_2$, $CdF_2$, $HgF$, $HgF_2$, $BF_3$, $AlF_3$, $GaF_3$, $InF_3$, $TlF_3$, $SiF_4$, $GeF_4$, $SnF_2$, $SnF_3$, $SnF_4$, $PbF_2$, $PbF_4$, $PF_3$, $PF_5$, $AsF_3$, $SbF_3$, $SbF_5$ and $BiF_3$. Among these, particular preference is given to $BF_3$, $AlF_3$, $TiF_4$, $FeF_2$, $FeF_3$ and $ZnF_2$. It is also possible to use mixtures of binary chlorine and fluorine compounds.

It is often also possible to use binary bromine compounds as Lewis acids of this kind; such bromine compounds are, for example: $TiBr_3$, $TiBr_4$, $ZrBr_4$, $VBr_3$, $VBr_4$, $CrBr_2$, $CrBr_3$, $MoBr_3$, $MoBr_5$, $WBr_5$, $WBr_6$, $MnBr_2$, $FeBr_2$, $FeBr_3$, $CoBr_2$, $CoBr_3$, $NiBr_2$, $PdBr_2$, $PtBr_2$, $CuBr$, $CuBr_2$, $AgBr$, $AuBr$, $ZnBr_2$, $CdBr_2$, $HgBr$, $HgBr_2$, $BBr_3$, $AlBr_3$, $SiBr_4$, $SnBr_2$, $SnBr_3$, $SnBr_4$, $PbBr_2$, $PbBr_4$, $PBr_3$, $PBr_5$, $AsBr_3$, $SbBr_3$, $SbBr_5$ and $BiBr_3$.

Very particular preference is given to using the preferred sulfonic acid initiators methanesulfonic acid, trifluoromethanesulfonic acid, trichloromethanesulfonic acid and toluenesulfonic acid together with the preferred Lewis acids or Lewis acid complexes with $BCl_3$, $AlCl_3$, $TiCl_4$, $FeCl_2$, $FeCl_3$, $ZnCl_2$, $BF_3$, $AlF_3$, $TiF_4$, $FeF_2$, $FeF_3$ and/or $ZnF_2$, in particular methanesulfonic acid together with $AlCl_3$, $BF_3$ or $FeCl_3$, especially when Lewis acid complexes which comprise the dihydrocarbyl ethers of the general formula $R^1—O—R^2$ and/or hydrocarbyl carboxylates of the general formula $R^3—COOR^4$ specified below as preferred as donors are used.

In the process according to the invention, preference is given to using a complex which is effective as a polymerization catalyst and comprises, as the donor, an organic compound with at least one ether function or a carboxylic ester function. It is of course also possible to use mixtures of different organic compounds with at least one ether function and/or of different organic compounds with at least one carboxylic ester function. If the complex effective as a polymerization catalyst has, as a donor, an organic compound with at least one ether function, compounds with at least one ether function are also understood to mean acetals and hemiacetals.

In a preferred embodiment of the present invention, a complex which is effective as a polymerization catalyst and is formed from at least one Lewis acid and at least one donor is used, in which the organic compound which functions as the donor is a dihydrocarbyl ether of the general formula $R^1—O—R^2$ in which the variables $R^1$ and $R^2$ are each independently $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals, or a hydrocarbyl carboxylate of the general formula $R^3$—$COOR^4$ in which the variables $R^3$ and $R^4$ are each independently $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals.

The dihydrocarbyl ethers mentioned may be open-chain or cyclic, where the two variables $R^1$ and $R^2$ in the case of the cyclic ethers may join to form a ring, where such rings may also comprise two or three ether oxygen atoms. Examples of such open-chain and cyclic dihydrocarbyl ethers are dimethyl ether, diethyl ether, di-n-propyl ether, diisopropyl ether, di-n-butyl ether, di-sec-butyl ether, diisobutyl ether, di-n-pentyl ether, di-n-hexyl ether, di-n-heptyl ether, di-n-octyl ether, di-(2-ethylhexyl)ether, methyl n-butyl ether, methyl sec-butyl ether, methyl isobutyl ether, methyl tert-butyl ether, ethyl n-butyl ether, ethyl sec-butyl ether, ethyl isobutyl ether, n-propyl n-butyl ether, n-propyl sec-butyl ether, n-propyl isobutyl ether, n-propyl tert-butyl ether, isopropyl n-butyl ether, isopropyl sec-butyl ether, isopropyl isobutyl ether, isopropyl tert-butyl ether, methyl n-hexyl ether, methyl n-octyl ether, methyl 2-ethylhexyl ether, ethyl n-hexyl ether, ethyl n-octyl ether, ethyl 2-ethylhexyl ether, n-butyl n-octyl ether, n-butyl 2-ethylhexyl ether, tetrahydrofuran, tetrahydropyran, 1,2-, 1,3- and 1,4-dioxane, dicyclohexyl ether, diphenyl ether, ditolyl ether, dixylyl ether and dibenzyl ether. Among the dihydrocarbyl ethers mentioned, di-n-butyl ether and diphenyl ether have been found to be particularly advantageous here as donors, especially in combination with the Lewis acids $BCl_3$, $AlCl_3$, $TiCl_4$, $FeCl_2$, $FeCl_3$ and $ZnCl_2$.

Examples of the hydrocarbyl carboxylates mentioned are methyl formate, ethyl formate, n-propyl formate, isopropyl formate, n-butyl formate, sec-butyl formate, isobutyl formate, tert-butyl formate, methyl acetate, ethyl acetate, n-propyl acetate, isopropyl acetate, n-butyl acetate, sec-butyl acetate, isobutyl acetate, tert-butyl acetate, methyl propionate, ethyl propionate, n-propyl propionate, isopropyl propionate, n-butyl propionate, sec-butyl propionate, isobutyl propionate, tert-butyl propionate, methyl butyrate, ethyl butyrate, n-propyl butyrate, isopropyl butyrate, n-butyl butyrate, sec-butyl butyrate, isobutyl butyrate, tert-butyl butyrate, methyl cyclohexanecarboxylate, ethyl cyclohexanecarboxylate, n-propyl cyclohexanecarboxylate, isopropyl cyclohexanecarboxylate, n-butyl cyclohexanecarboxylate, sec-butyl cyclohexanecarboxylate, isobutyl cyclohexanecarboxylate, tert-butyl cyclohexanecarboxylate, methyl benzoate, ethyl benzoate, n-propyl benzoate, isopropyl benzoate, n-butyl benzoate, sec-butyl benzoate, isobutyl benzoate, tert-butyl benzoate, methyl phenylacetate, ethyl phenylacetate, n-propyl phenylacetate, isopropyl phenylacetate, n-butyl phenylacetate, sec-butyl phenylacetate, isobutyl phenylacetate and tert-butyl phenylacetate. Among the hydrocarbyl carboxylates mentioned, ethyl acetate has been found to be particularly advantageous here as a donor, especially in combination with the Lewis acids $BCl_3$, $AlCl_3$, $TiCl_4$, $FeCl_2$, $FeCl_3$ and $ZnCl_2$.

In addition, dihydrocarbyl ethers and hydrocarbyl carboxylates particularly advantageous as donors, especially in combination with the Lewis acids $BCl_3$, $AlCl_3$, $TiCl_4$, $FeCl_2$, $FeCl_3$ and $ZnCl_2$, have been found to be those in which the donor compound has a total carbon number of 3 to 16, preferably of 4 to 16, especially of 4 to 12, in particular of 4 to 8. In the specific case of the dihydrocarbyl ethers, preference is given in particular to those having a total of 6 to 14 and especially 8 to 12 carbon atoms. In the specific case of the hydrocarbyl carboxylates, preference is given in particular to those having a total of 3 to 10 and especially 4 to 6 carbon atoms.

The molar ratio of the donor compounds mentioned to the Lewis acids, i.e. especially to the element halides and alkyl element halides mentioned, especially to the Lewis acids $BCl_3$, $AlCl_3$, $TiCl_4$, $FeCl_2$, $FeCl_3$ and $ZnCl_2$, in the complex effective as a polymerization catalyst, generally varies within the range from 0.3:1 to 1.5:1, especially from 0.5:1 to 1.2:1, in particular 0.7:1 to 1.1:1; in most cases it is 1:1. However, it is also possible to work with a greater excess of the donor compounds, often up to a 10-fold and especially 3-fold molar excess; the excess amount of donor compounds then acts additionally as a solvent or diluent.

Typically, the complex effective as a polymerization catalyst is prepared before the polymerization separately from the Lewis acid(s) mentioned, which is/are generally used in anhydrous form, and the donor compound(s), and is then—usually dissolved in an inert solvent such as a halogenated hydrocarbon, for example dichloromethane—added to the polymerization medium. However, the complex can also be prepared in situ prior to the polymerization.

In a preferred embodiment of the present invention, the polymerization is performed with additional use of at least one further initiator which is mono- or polyfunctional, especially mono-, di- or trifunctional, and is selected from organic hydroxyl compounds, organic halogen compounds and water. It is also possible to use mixtures of such further initiators, for example mixtures of two or more organic hydroxyl compounds, mixtures of two or more organic halogen compounds, mixtures of one or more organic hydroxyl compounds and one or more organic halogen compounds, mixtures of one or more organic hydroxyl compounds and water or mixtures of one or more organic halogen compounds and water. The initiator may be mono-, di- or polyfunctional, i.e. one, two or more hydroxyl groups or halogen atoms, which start the polymerization reaction, may be present in the initiator molecule. In the case of di- or polyfunctional initiators, telechelic isobutene polymers with two or more, especially two or three, polyisobutene chain ends are typically obtained.

Organic hydroxyl compounds which have only one hydroxyl group in the molecule and are suitable as monofunctional initiators include especially alcohols and phenols, in particular those of the general formula $R^5$—OH, in which $R^5$ denotes $C_1$- to $C_{20}$-alkyl radicals, especially $C_1$- to $C_8$-alkyl radicals, $C_5$- to $C_5$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. In addition, the $R^5$ radicals may also comprise mixtures of the abovementioned structures and/or have other functional groups than those already mentioned, for example a keto function, a nitroxide or a carboxyl group, and/or heterocyclic structural elements.

Typical examples of such organic monohydroxyl compounds are methanol, ethanol, n-propanol, isopropanol, n-butanol, sec-butanol, isobutanol, tert-butanol, n-pentanol, n-hexanol, n-heptanol, n-octanol, 2-ethylhexanol, cyclohexanol, phenol, p-methoxy-phenol, o-, m- and p-cresol, benzyl alcohol, p-methoxybenzyl alcohol, 1- and 2-phenylethanol, 1- and 2-(p-methoxyphenyl)ethanol, 1-, 2- and 3-phenyl-1-propanol, 1-, 2- and 3-(p-methoxyphenyl)-1-propanol, 1- and 2-phenyl-2-propanol, 1- and 2-(p-methoxyphenyl)-2-propanol, 1-, 2-, 3- and 4-phenyl-1-butanol, 1-, 2-, 3- and 4-(p-methoxy-phenyl)-1-butanol, 1-, 2-, 3- and 4-phenyl-2-butanol, 1-, 2-, 3- and 4-(p-methoxy-phenyl)-2- butanol, 9-methyl-9H-fluoren-9-ol, 1,1-diphenylethanol, 1,1-diphenyl-2-propyn-1-ol, 1,1-diphenylpropanol, 4-(1-hydroxy-1-phenylethyl)benzonitrile, cyclopropyldiphenylmethanol, 1-hydroxy-1,1-diphenylpropan-2-one, benzilic acid, 9-phenyl-9-fluorenol, triphenylmethanol, diphenyl(4-pyridinyl)methanol, alpha,alpha-diphenyl-2-pyridinemethanol, 4-methoxytrityl alcohol (especially polymer-bound as a solid phase), alpha-tert-butyl-4-chloro-4'-methylbenzhydrol, cyclohexyldiphenyl-methanol, alpha-(p-tolyl)-benzhydrol, 1,1,2-triphenylethanol, alpha,alpha-diphenyl-2-pyridineethanol, alpha,alpha-4-pyridylbenzhydrol N-oxide, 2-fluorotriphenylmethanol, triphenylpropargyl alcohol, 4-[(diphenyl)hydroxymethyl]benzonitrile, 1-(2,6-dimethoxyphenyl)-2-methyl-1-phenyl-1-propanol, 1,1,2-triphenylpropan-1-ol and p-anisaldehyde carbinol.

Organic hydroxyl compounds which have two hydroxyl groups in the molecule and are suitable as bifunctional initiators are especially dihydric alcohols or diols having a total carbon number of 2 to 30, especially of 3 to 24, in particular of 4 to 20, and bisphenols having a total carbon number of 6 to 30, especially of 8 to 24, in particular of 10 to 20, for example ethylene glycol, 1,2- and 1,3-propylene glycol, 1,4-butylene glycol, 1,6-hexylene glycol, 1,2-, 1,3- or 1,4-bis(1-hydroxy-1-methylethyl)benzene (o-, m- or p-dicumyl alcohol), bisphenol A, 9,10-di-hydro-9,10-dimethyl-9,10-anthracenediol, 1,1-diphenylbutane-1,4-diol, 2-hydroxytriphenylcarbinol and 9-[2-(hydroxymethyl)-phenyl]-9-fluorenol.

Organic halogen compounds which have one halogen atom in the molecule and are suitable as monofunctional initiators are in particular compounds of the general formula $R^6$-Hal in which Hal is a halogen atom selected from fluorine, iodine and especially chlorine and bromine, and $R^6$ denotes $C_1$- to $C_{20}$-alkyl radicals, especially $C_1$- to $C_8$-alkyl radicals, $C_5$- to $C_8$-cycloalkyl radicals or $C_7$- to $C_{20}$-arylalkyl radicals, especially $C_7$- to $C_{12}$-arylalkyl radicals. In addition, the $R^6$ radicals may also comprise mixtures of the abovementioned structures and/or have other functional groups than those already mentioned, for example a keto function, a nitroxide or a carboxyl group, and/or heterocyclic structural elements.

Typical examples of such organic monohalogen compounds are methyl chloride, methyl bromide, ethyl chloride, ethyl bromide, 1-chloropropane, 1-bromopropane, 2-chloropropane, 2-bromopropane, 1-chlorobutane, 1-bromobutane, sec-butyl chloride, sec-butyl bromide, isobutyl chloride, isobutyl bromide, tert-butyl chloride, tert-butyl bromide, 1-chloropentane, 1-bromopentane, 1-chlorohexane, 1-bromohexane, 1-chloroheptane, 1-bromoheptane, 1-chlorooctane, 1-bromooctane, 1-chloro-2-ethylhexane, 1-bromo-2-ethylhexane, cyclohexyl chloride, cyclohexyl bromide, benzyl chloride, benzyl bromide, 1-phenyl-1-chloroethane, 1-phenyl-1-bromoethane, 1-phenyl-2-chloroethane, 1-phenyl-2-bromoethane, 1-phenyl-1-chloropropane, 1-phenyl-1-bromopropane, 1-phenyl-2-chloropropane, 1-phenyl-2-bromopropane, 2-phenyl-2-chloropropane, 2-phenyl-2-bromopropane, 1-phenyl-3-chloropropane, 1-phenyl-3-bromopropane, 1-phenyl-1-chlorobutane, 1-phenyl-1-bromobutane, 1-phenyl-2-chlorobutane, 1-phenyl-2-bromobutane, 1-phenyl-3-chlorobutane, 1-phenyl-3-bromobutane, 1-phenyl-4-chlorobutane, 1-phenyl-4-bromobutane, 2-phenyl-1-chlorobutane, 2-phenyl-1-bromobutane, 2-phenyl-2-chlorobutane, 2-phenyl-2-bromobutane, 2-phenyl-3-chlorobutane, 2-phenyl-3-bromobutane, 2-phenyl-4-chlorobutane and 2-phenyl-4-bromobutane.

Organic halogen compounds which have two halogen atoms in the molecule and are suitable as difunctional initiators are, for example, 1,3-bis(1-bromo-1-methylethyl)-benzene, 1,3-bis(2-chloro-2-propyl)benzene (1,3-dicumyl chloride) and 1,4-bis(2-chloro-2-propyl)benzene (1,4-dicumyl chloride).

The further initiator is more preferably selected from organic hydroxyl compounds in which one or more hydroxyl groups are each bonded to an $sp^3$-hybridized carbon atom, organic halogen compounds in which one or more halogen atoms are each bonded to an $sp^3$-hybridized carbon atom, protic acids and water. Among these, preference is given especially to an initiator selected from organic hydroxyl compounds in which one or more hydroxyl groups are each bonded to an $sp^3$-hybridized carbon atom.

In the case of the organic halogen compounds, particularly preferred further initiators are additionally those in which the one or more halogen atoms are each bonded to a secondary or especially to a tertiary $sp^3$-hybridized carbon atom.

Preference is given in particular to further initiators which bear, on such an $sp^3$-hybridized carbon atom, in addition to the hydroxyl group, the $R^5$, $R^6$ and $R^7$ radicals which are each independently hydrogen, $C_1$- to $C_{20}$-alkyl, $C_5$- to $C_5$-cycloalkyl, $C_6$- to $C_{20}$-aryl, $C_7$- to $C_{20}$-alkylaryl or phenyl, where an aromatic ring may also bear one or more, preferably one or two, $C_1$- to $C_4$-alkyl, $C_1$- to $C_4$-alkoxy, $C_1$- to $C_4$-hydroxyalkyl or $C_1$- to $C_4$-haloalkyl radicals as substituents, where at most one of the variables $R^5$, $R^6$ and $R^7$ is hydrogen and at least one of the variables $R^5$, $R^6$ and $R^7$ is phenyl which may also bear one or more, preferably one or two, $C_1$- to $C_4$-alkyl, $C_1$- to $C_4$-alkoxy, $C_1$- to $C_4$-hydroxyalkyl or $C_1$- to $C_4$-haloalkyl radicals as substituents.

Examples of useful protic acids include hydrochloric acid, hydrobromic acid, hydrofluoric acid, sulfuric acid, hydrocyanic acid and mixtures thereof. However, the protic acids used may also be protonated ethers.

For the present invention, very particular preference is given to further initiators selected from water, one or more protic acids, methanol, ethanol, 1-phenylethanol, 1-(p-methoxyphenyl)ethanol, n-propanol, isopropanol, 2-phenyl-2-propanol (cumene), n-butanol, isobutanol, sec-butanol, tert-butanol, 1-phenyl-1-chloroethane, 2-phenyl-2-chloropropane (cumyl chloride), tert-butyl chloride and 1,3- or 1,4-bis(1-hydroxy-1-methylethyl)benzene, and mixtures thereof. Among these, preference is given especially to further initiators selected from water, one or more protic acids, methanol, ethanol, 1-phenylethanol, 1-(p-methoxyphenyl)ethanol, n-propanol, isopropanol, 2-phenyl-2-propanol (cumene), n-butanol, isobutanol, sec-butanol, tert-butanol, 1-phenyl-1-chloroethane and 1,3- or 1,4-bis(1-hydroxy-1-methylethyl)benzene, and mixtures thereof.

The molar ratio of the sum of the organic sulfonic acids of the general formula Z—SO$_3$H used in accordance with the invention and of any further initiators to be used among those mentioned to the isobutene monomer used in the case of homopolymerization of isobutene, or to the total amount of the polymerizable monomers used in the case of copolymerization of isobutene, based on each individual functional site of the initiator (the organic sulfonic acids should be considered as monofunctional), is generally 0.001:1 to 0.5:1, especially 0.01:1 to 0.4:1, in particular 0.1:1 to 0.3:1. In the case of use of water as the sole further initiator or in combination with organic hydroxyl compounds and/or organic halogen compounds as further initiators, the molar ratio of water alone to the isobutene monomer used in the case of homopolymerization of isobutene, or to the total amount of polymerizable monomers used in the case of copolymerization of isobutene, is especially 0.0001:1 to 0.1:1, in particular 0.0002:1 to 0.05:1.

A proportion of the initiator molecules added as organic sulfonic acids and optionally as organic hydroxyl or halogen compounds may be incorporated into the polymer chains. The proportion ($I_{eff}$) of polymer chains which are started by such an incorporated organic initiator molecule may be up to 100%, is generally 0 to 90% and may be 5 to 90%. The remaining polymer chains arise either from water originating from traces of moisture as an initiator molecule, or from chain transfer reactions.

In a further preferred embodiment of the present invention, the polymerization is performed in the presence of 0.01 to 10 mmol, especially of 0.05 to 5.0 mmol, in particular of 0.1 to 1.0 mmol, based in each case on 1 mol of isobutene monomer used in the case of homopolymerization of isobutene, or on 1 mol of the total amount of the polymerizable monomers used in the case of copolymerization of isobutene, of a basic nitrogen compound.

Such a basic nitrogen compound used may be an aliphatic, cycloaliphatic or aromatic amine of the general formula $R^7$—$NR^8R^9$, or else ammonia, in which the variables $R^7$, $R^8$ and $R^9$ are each independently hydrogen, $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. When none of these variables is hydrogen, the amine is a tertiary amine. When one of these variables is hydrogen, the amine is a secondary amine. When two of these variables is hydrogen, the amine is a primary amine. When all these variables are hydrogen, the amine is ammonia.

Typical examples of such amines of the general formula $R^7$—$NR^8R^9$ are methylamine, ethylamine, n-propylamine, isopropylamine, n-butylamine, tert-butylamine, sec-butylamine, isobutylamine, tert-amylamine, n-hexylamine, n-heptylamine, n-octylamine, 2-ethylhexylamine, cyclopentylamine, cyclohexylamine, aniline, dimethylamine, diethylamine, di-n-propylamine, diisopropylamine, di-n-butylamine, di-tert-butylamine, di-sec-butylamine, diisobutylamine, di-tert-amylamine, di-n-hexylamine, di-n-heptylamine, di-n-octylamine, di-(2-ethylhexyl)amine, dicyclopentylamine, dicyclohexylamine, diphenylamine, trimethylamine, triethylamine, tri-n-propylamine, tri-isopropylamine, tri-n-butylamine, tri-tert-butylamine, tri-sec-butylamine, tri-isobutylamine, tri-tert-amylamine, tri-n-hexylamine, tri-n-heptylamine, tri-n-octylamine, tri-(2-ethylhexyl)amine, tricyclopentylamine, tricyclohexylamine, triphenylamine, dimethylethylamine, methyl-n-butylamine, N-methyl-N-phenylamine, N,N-dimethyl-N-phenylamine, N-methyl-N,N-diphenylamine or N-methyl-N-ethyl-N-n-butylamine.

In addition, such a basic nitrogen compound used may also be a compound having a plurality of, especially having two or three, nitrogen atoms and having 2 to 20 carbon atoms, where these nitrogen atoms may each independently bear hydrogen atoms or aliphatic, cycloaliphatic or aromatic substituents. Examples of such polyamines are 1,2-ethylenediamine, 1,3-propylenediamine, 1,4-butylenediamine, diethylenetriamine, N-methyl-1,2-ethylenediamine, N,N-dimethyl-1,2-ethylenediamine, N,N'-dimethyl-1,2-ethylenediamine or N,N-dimethyl-1,3-propylenediamine.

However, a suitable basic nitrogen compound of this kind is especially a saturated, partly unsaturated or unsaturated nitrogen-containing five-membered or six-membered heterocyclic ring which comprises one, two or three ring nitrogen atoms and may have one or two further ring heteroatoms from the group of oxygen and sulfur and/or hydrocarbyl radicals, especially $C_1$- to $C_4$-alkyl radicals and/or phenyl, and/or functional groups or heteroatoms as substituents, especially fluorine, chlorine, bromine, nitro and/or cyano, for example pyrrolidine, pyrrole, imidazole, 1,2,3- or 1,2,4-triazole, oxazole, thiazole, piperidine, pyrazane, pyrazole, pyridazine, pyrimidine, pyrazine, 1,2,3-, 1,2,4- or 1,2,5-triazine, 1,2,5-oxathiazine, 2H-1,3,5-thiadiazine or morpholine.

However, a very particularly suitable basic nitrogen compound of this kind is pyridine or a derivative of pyridine (especially a mono-, di- or tri-$C_1$- to $C_4$-alkyl-substituted pyridine) such as 2-, 3-, or 4-methylpyridine (picolines), 2,3-, 2,4-, 2,5-, 2,6-, 3,4-, 3,5- or 3,6-dimethylpyridine (lutidines), 2,4,6-trimethylpyridine (collidine), 2-, 3,- or 4-tert-butylpyridine, 2-tert-butyl-6-methylpyridine, 2,4-, 2,5-, 2,6- or 3,5-di-tert-butylpyridine or else 2-, 3- or 4-phenylpyridine.

It is possible to use a single basic nitrogen compound or mixtures of such basic nitrogen compounds.

For the use of isobutene or of an isobutene-comprising monomer mixture as the monomer to be polymerized, suitable isobutene sources in embodiments (A) and (B) are both pure isobutene and isobutenic $C_4$ hydrocarbon streams, for example $C_4$ raffinates, especially "raffinate 1", $C_4$ cuts from isobutane dehydrogenation, $C_4$ cuts from steam crackers and from FCC crackers (fluid catalyzed cracking), provided that they have been substantially freed of 1,3-butadiene present therein. A $C_4$ hydrocarbon stream from an FCC refinery unit is also known as "b/b" stream. Further suitable isobutenic $C_4$ hydrocarbon streams are, for example, the product stream of a propylene-isobutane cooxidation or the product stream from a metathesis unit, which are generally used after customary purification and/or concentration. Suitable $C_4$ hydrocarbon streams generally comprise less than 500 ppm, preferably less than 200 ppm, of butadiene. The presence of 1-butene and of cis- and trans-2-butene is substantially uncritical. Typically, the isobutene concentration in the $C_4$ hydrocarbon streams mentioned is in the range from 30 to 60% by weight. For instance, raffinate 1 generally consists essentially of 30 to 50% by weight of isobutene, 10 to 50% by weight of 1-butene, 10 to 40% by weight of cis- and trans-2-butene, and 2 to 35% by weight of butanes; in the polymerization process according to the invention, the unbranched butenes in the raffinate 1 generally behave virtually inertly, and only the isobutene is polymerized.

In a preferred embodiment, the monomer source used for the polymerization is a technical $C_4$ hydrocarbon stream with an isobutene content of 1 to 100% by weight, especially of 1 to 99% by weight, in particular of 1 to 90% by weight, more preferably of 30 to 60% by weight, especially a raffinate 1 stream, a b/b stream from an FCC refinery unit, a product stream from a propylene-isobutane cooxidation or a product stream from a metathesis unit.

The isobutenic monomer mixture mentioned may comprise small amounts of contaminants such as water, carboxylic acids or mineral acids, without there being any critical yield or selectivity losses. It is appropriate to prevent enrichment of these impurities by removing such harmful substances from the isobutenic monomer mixture, for example by adsorption on solid adsorbents such as activated carbon, molecular sieves or ion exchangers.

It is also possible to convert monomer mixtures of isobutene or of the isobutenic hydrocarbon mixture with olefinically unsaturated monomers copolymerizable with isobutene. When monomer mixtures of isobutene are to be copolymerized with suitable comonomers, the monomer mixture preferably comprises at least 5% by weight, more preferably at least 10% by weight and especially at least 20% by weight of isobutene, and preferably at most 95% by weight, more preferably at most 90% by weight and especially at most 80% by weight of comonomers.

Useful copolymerizable monomers include: vinylaromatics such as styrene and α-methylstyrene, $C_1$- to $C_4$-alkylstyrenes such as 2-, 3- and 4-methylstyrene, and 4-tert-butylstyrene, halostyrenes such as 2-, 3- or 4-chlorostyrene, and isoolefins having 5 to 10 carbon atoms, such as 2-methylbutene-1,2-methylpentene-1,2-methylhexene-1,2-ethylpentene-1,2-ethylhexene-1 and 2-propylheptene-1. Further useful comonomers include olefins which have a silyl group, such as 1-trimethoxysilylethene, 1-(trimethoxy-silyl)propene, 1-(trimethoxysilyl)-2-methylpropene-2,1-[tri(methoxyethoxy)silyl]ethene, 1-[tri(methoxyethoxy)silyl]propene, and 1-[tri(methoxyethoxy)silyl]-2-methylpropene-2. In addition—depending on the polymerization conditions—useful comonomers also include isoprene, 1-butene and cis- and trans-2-butene.

When the process according to the invention is to be used to prepare copolymers, the process can be configured so as to preferentially form random polymers or to preferentially form block copolymers. To prepare block copolymers, for example, the different monomers can be supplied successively to the polymerization reaction, in which case the second comonomer is especially not added until the first comonomer is already at least partly polymerized. In this manner, diblock, triblock and higher block copolymers are obtainable, which, according to the sequence of monomer addition, have a block of one or the other comonomer as a terminal block. In some cases, however, block copolymers also form when all comonomers are supplied to the polymerization reaction simultaneously, but one of them polymerizes significantly more rapidly than the other(s). This is the case especially when isobutene and a vinylaromatic compound, especially styrene, are copolymerized in the process according to the invention. This preferably forms block copolymers with a terminal polystyrene block. This is attributable to the fact that the vinylaromatic compound, especially styrene, polymerizes significantly more slowly than isobutene.

The polymerization can be effected either continuously or batchwise. Continuous processes can be performed in analogy to known prior art processes for continuous polymerization of isobutene in the presence of boron trifluoride-based catalysts in the liquid phase.

The process according to the invention is suitable either for performance at low temperatures, e.g. at −90° C. to 0° C., or at higher temperatures, i.e. at at least 0° C., e.g. at 0° C. to +30° C. or at 0° C. to +50° C. The polymerization in the process according to the invention is, however, preferably performed at relatively low temperatures in embodiment (A), generally at −70° C. to −10° C., especially at −60° C. to −15° C., and in embodiment (B) at somewhat higher temperatures from −30° C. to +50° C., especially at 0° C. to +30° C., for example at room temperature (+20 to +25° C.).

When the polymerization in the process according to the invention is effected at or above the boiling temperature of the monomer or monomer mixture to be polymerized, it is preferably performed in pressure vessels, for example in autoclaves or in pressure reactors.

The polymerization in the process according to the invention is preferably performed in the presence of an inert diluent. The inert diluent used should be suitable for reducing the increase in the viscosity of the reaction solution which generally occurs during the polymerization reaction to such an extent that the removal of the heat of reaction which evolves can be ensured. Suitable diluents are those solvents or solvent mixtures which are inert toward the reagents used. Suitable diluents are, for example, aliphatic hydrocarbons such as n-butane, n-pentane, n-hexane, n-heptane, n-octane and isooctane, cycloaliphatic hydrocarbons such as cyclopentane and cyclohexane, aromatic hydrocarbons such as benzene, toluene and the xylenes, and halogenated hydrocarbons, especially halogenated aliphatic hydrocarbons, such as methyl chloride, dichloromethane and trichloromethane (chloroform), 1,1-dichloroethane, 1,2-dichloroethane, trichloroethane and 1-chlorobutane, and also halogenated aromatic hydrocarbons and alkylaromatics halogenated in the alkyl side chains, such as chloro-benzene, monofluoromethylbenzene, difluoromethylbenzene and trifluoromethyl-benzene, and mixtures of the aforementioned diluents. Preferred halogenated hydrocarbons for the inert diluents mentioned above and below are chlorinated hydrocarbons, especially pure chlorohydrocarbons. Fluorohydrocarbons are preferably excluded from the inert diluents usable here in order to very substantially rule out residual contents of fluorine in the polymer. The diluents used, or the constituents used in the solvent mixtures mentioned, are also the inert components of isobutenic $C_4$ hydrocarbon streams.

According to embodiment (A), the inventive polymerization is preferably performed in a halogenated hydrocarbon, especially in a halogenated aliphatic hydrocarbon, or in a mixture of halogenated hydrocarbons, especially of halogenated aliphatic hydrocarbons, or in a mixture of at least one halogenated hydrocarbon, especially a halogenated aliphatic hydrocarbon, and at least one aliphatic, cycloaliphatic or aromatic hydrocarbon as an inert diluent, for example a mixture of dichloromethane and n-hexane, typically in a volume ratio of 10:90 to 90:10, especially of 50:50 to 85:15. Prior to use, the diluents are preferably freed of impurities such as water, carboxylic acids or mineral acids, for example by adsorption on solid adsorbents such as activated carbon, molecular sieves or ion exchangers.

In a further preferred variant of embodiment (A), the inventive polymerization is performed in halogen-free aliphatic or especially halogen-free aromatic hydrocarbons, especially toluene. For this embodiment, water in combination with the organic hydroxyl compounds mentioned and/or the organic halogen compounds mentioned, or especially as the sole initiator, have been found to be particularly advantageous.

Preferably, according to embodiment (B), the inventive polymerization is performed in an aliphatic, cycloaliphatic or aromatic hydrocarbon, in a halogenated aliphatic hydrocarbon or in a mixture of aliphatic, cycloaliphatic and/or aromatic hydrocarbons or of halogenated aliphatic hydrocarbons or in a mixture of at least one halogenated aliphatic hydrocarbon and at least one aliphatic, cycloaliphatic or aromatic hydrocarbon as an inert diluent.

The polymerization in the process according to the invention is preferably performed under substantially aprotic and especially under substantially anhydrous reaction conditions. Substantially aprotic and substantially anhydrous reaction conditions are understood to mean that, respectively, the content of protic impurities and the water content in the reaction mixture are less than 50 ppm and especially less than 5 ppm. In general, the feedstocks will therefore be dried before use by physical and/or chemical measures. More particularly, it has been found to be useful to admix the aliphatic or cycloaliphatic hydrocarbons used as solvents, after customary prepurification and predrying with an organometallic compound, for example an organolithium, organomagnesium or organoaluminum compound, in an amount which is sufficient to substantially remove the water traces from the solvent. The solvent thus treated is then preferably condensed directly into the reaction vessel. It is also possible to proceed in a similar manner with the monomers to be polymerized, especially with isobutene or with the isobutenic mixtures. Drying with other customary desiccants such as molecular sieves or predried oxides such as aluminum oxide, silicon dioxide, calcium oxide or barium oxide is also suitable. The halogenated solvents for which drying with metals such as sodium or potassium or with metal alkyls is not an option are freed of water or water traces with desiccants suitable for that purpose, for example with calcium chloride, phosphorus pentoxide or molecular sieves. It is also possible in an analogous manner to dry those feedstocks for which treatment with metal alkyls is likewise not an option, for example vinylaromatic compounds. Even if some or all of the initiator used is water, residual moisture should preferably be removed very substantially or completely from solvents and monomers by drying prior to reaction, in order to be able to use the water initiator in a controlled specified amount, as a result of which greater process control and reproducibility of the results are obtained.

The polymerization of the isobutene or of the isobutenic starting material generally proceeds spontaneously when the polymerization catalyst, i.e. the iron halide-donor complex, the aluminum trihalide-donor complex or the alkylaluminum halide-donor complex, especially the iron chloride-donor complex or the aluminum trichloride-donor complex, or the Lewis acid complex comprising at least one organic sulfonic acid with or without donors is contacted with the isobutene or the isobutenic monomer mixture at the desired reaction temperature. The procedure here may be to initially charge the monomers, optionally in the diluent, to bring it to reaction temperature and then to add the polymerization catalyst, i.e. the iron halide-donor complex, the aluminum trihalide-donor complex or the alkylaluminum halide-donor complex, especially the iron chloride-donor complex or the aluminum trichloride-donor complex, or the Lewis acid complex comprising at least one organic sulfonic acid with or without donors. The procedure may also be to initially charge the polymerization catalyst, i.e. the iron halide-donor complex, the aluminum trihalide-donor complex or the alkylaluminum halide-donor complex, especially the iron chloride-donor complex or the aluminum trichloride-donor complex, or the Lewis acid complex comprising at least one organic sulfonic acid with or without donors, optionally in the diluent, and then to add the monomers. In that case, the start of polymerization is considered to be that time at which all reactants are present in the reaction vessel.

To prepare isobutene copolymers, the procedure may be to initially charge the monomers, optionally in the diluent, and then to add the polymerization catalyst, i.e. the iron halide-donor complex, the aluminum trihalide-donor complex or the alkylaluminum halide-donor complex, especially the iron chloride-donor complex or the aluminum trichloride-donor complex, or the Lewis acid complex comprising at least one organic sulfonic acid with or without donors. The reaction temperature can be established before or after the addition of the polymerization catalyst, i.e. the iron halide-donor complex, the aluminum trihalide-donor complex or the alkylaluminum halide-donor complex, especially of the iron chloride-donor complex or the aluminum trichloride-donor complex, or the Lewis acid complex comprising at least one organic sulfonic acid with or without donors. The procedure may also be first to initially charge only one of the monomers, optionally in the diluent, then to add the polymerization catalyst, i.e. the iron halide-donor complex, the aluminum trihalide-donor complex or the alkylaluminum halide-donor complex, especially the iron chloride-donor complex or the aluminum trichloride-donor complex, or the Lewis acid complex comprising at least one organic sulfonic acid with or without donors, and to add the further monomer(s) only after a certain time, for example when at least 60%, at least 80% or at least 90% of the monomer has been converted. Alternatively, the polymerization catalyst, i.e. the iron halide-donor complex, the aluminum trihalide-donor complex or the alkylaluminum halide-donor complex, especially the iron chloride-donor complex or the aluminum trichloride-donor complex, or the Lewis acid complex comprising at least one organic sulfonic acid with or without donors, can be initially charged, optionally in the diluent, then the monomers can be added simultaneously or successively, and then the desired reaction temperature can be established. In that case, the start of polymerization is considered to be that time at which the polymerization catalyst, i.e. the iron halide-donor complex, the aluminum trihalide-donor complex or the alkylaluminum halide-donor complex, especially the iron chloride-donor complex or the aluminum trichloride-donor complex, or the Lewis acid complex comprising at least one organic sulfonic acid with or without donors, and at least one of the monomers are present in the reaction vessel.

In addition to the batchwise procedure described here, the polymerization in the process according to the invention can also be configured as a continuous process. In this case, the feedstocks, i.e. the monomer(s) to be polymerized, optionally the diluent and optionally the polymerization catalyst, i.e. the iron halide-donor complex, the aluminum trihalide-donor complex or the alkylaluminum halide-donor complex, especially the iron chloride-donor complex or the aluminum trichloride-donor complex, or the Lewis acid complex comprising at least one organic sulfonic acid with or without donors, are supplied continuously to the polymerization reaction, and reaction product is withdrawn continuously, such that more or less steady-state polymerization conditions are established in the reactor. The monomer(s) to be polymerized can be supplied as such, diluted with a diluent or solvent, or as a monomer-containing hydrocarbon stream.

The iron halide-donor complex, the aluminum trihalide-donor complex or the alkylaluminum halide-donor complex, especially the iron chloride-donor complex or the aluminum trichloride-donor complex, or the Lewis acid complex comprising at least one organic sulfonic acid with or without donors, effective as a polymerization catalyst is generally present in dissolved, dispersed or suspended form in the polymerization medium. Supporting of the iron halide-donor complex, the aluminum trihalide-donor complex or of the alkylaluminum halide-donor complex, especially of the iron chloride-donor complex or the aluminum trichloride-donor complex, or the Lewis acid complex comprising at least one organic sulfonic acid with or without donors, on customary support materials is also possible. Suitable reactor types for the polymerization process of the present invention are typically stirred tank reactors, loop reactors and tubular reactors, but also fluidized bed reactors, stirred tank reactors with or without solvent, fluid bed reactors, continuous fixed bed reactors and batchwise fixed bed reactors (batchwise mode).

In the process according to the invention, the iron halide-donor complex effective as a polymerization catalyst, the aluminum trihalide-donor complex or the alkylaluminum halide-donor complex, especially the iron chloride-donor complex or the aluminum trichloride-donor complex, or the Lewis acid complex comprising at least one organic sulfonic acid with or without donors, is generally used in such an amount that the molar ratio of element of transition groups 1 to 8 or main groups 3 to 5 of the Periodic Table, in particular iron and aluminum in the iron halide-donor complex, aluminum trihalide-donor complex or alkylaluminum halide-donor complex, especially in the iron chloride-donor complex or aluminum trichloride-donor complex, or in the corresponding Lewis acid complex comprising at least one organic sulfonic acid with or without donors, to isobutene in the case of homopolymerization of isobutene, or to the total amount of the polymerizable monomers used in the case of copolymerization of isobutene, is in the range from 1:10 to 1:5000, especially 1:15 to 1:1000, in particular 1:20 to 1:250.

To stop the reaction, the reaction mixture is preferably deactivated, for example by adding a protic compound, especially by adding water, alcohols such as methanol, ethanol, n-propanol and isopropanol or mixtures thereof with water, or by adding an aqueous base, for example an aqueous solution of an alkali metal or alkaline earth metal hydroxide such as sodium hydroxide, potassium hydroxide, magnesium hydroxide or calcium hydroxide, an alkali metal or alkaline earth metal carbonate such as sodium, potassium, magnesium or calcium carbonate, or an alkali metal or alkaline earth metal hydrogencarbonate such as sodium, potassium, magnesium or calcium hydrogencarbonate.

In the process according to the invention, the monomer component (b) used comprises the described high-reactivity isobutene homo- or copolymers with a content of terminal vinylidene double bonds (α-double bonds) per polyisobutene chain end of at least 50 mol %, preferably of at least 60 mol %, preferably of at least 70 mol %, preferably of at least 80 mol %, preferably of at least 85 mol %, more preferably of at least 90 mol %, even more preferably of more than 91 mol % and especially of at least 95 mol %, for example of virtually 100 mol %. More particularly, high-reactivity isobutene copolymers which are formed from isobutene and at least one vinylaromatic monomer, especially styrene, and have a content of terminal vinylidene double bonds (α-double bonds) per polyisobutene chain end of at least 50 mol %, preferably of at least 60 mol %, preferably of at least 70 mol %, preferably of at least 80 mol %, preferably of at least 85 mol %, more preferably of at least 90 mol %, even more preferably of more than 91 mol % and especially of at least 95 mol %, for example of virtually 100 mol %, are also used. To prepare such copolymers of isobutene and at least one vinylaromatic monomer, especially styrene, isobutene or an isobutenic hydrocarbon cut is copolymerized with the at least one vinylaromatic monomer in a weight ratio of isobutene to vinylaromatic of 5:95 to 95:5, especially of 30:70 to 70:30.

The high-reactivity isobutene homo- or copolymers used in accordance with the invention and specifically the isobutene homopolymers preferably have a polydispersity (PDI=$M_w/M_n$) of 1.05 to less than 3.5, preferably of 1.05 to less than 3.0, preferably of 1.05 to less than 2.5, preferably of 1.05 to 2.3, more preferably of 1.05 to 2.0 and especially of 1.1 to 1.85. Typical PDI values in the case of an optimal process regime are 1.2 to 1.7.

The high-reactivity isobutene homo- or copolymers used in accordance with the invention preferably possess a number-average molecular weight $M_n$ (determined by gel permeation chromatography) of preferably 500 to 250 000, more preferably of 500 to 100 000, even more preferably of 500 to 25 000 and especially of 500 to 5000. Isobutene homopolymers even more preferably possess a number-average molecular weight $M_n$ of 500 to 10 000 and especially of 500 to 5000, for example of about 1000 or of about 2300.

More particularly, suitable monomer components (b) of the process according to the invention are those isobutene polymers which have been formed by homopolymerizing isobutene or copolymerizing isobutene with up to 20% by weight of n-butene, are monofunctional and have a number-average molecular weight ($M_n$) of 500 to 5000, in particular 650 to 2500.

More particularly, suitable monomer components (b) for the process according to the invention are also those isobutene polymers which have been formed by homopolymerizing isobutene or copolymerizing isobutene with up to 20% by weight of n-butene, in each case with additional use of a di- or trifunctional initiator (inifer), are di- or trifunctional and have a number-average molecular weight ($M_n$) of 500 to 10 000, in particular 1000 to 5000.

More particularly, suitable monomer components (b) for the process according to the invention are also those isobutene polymers which have been formed by copolymerizing isobutene with at least one vinylaromatic comonomer, especially styrene, optionally with additional use of a di- or trifunctional initiator (inifer), are mono-, di- or trifunctional and have a number-average molecular weight ($M_n$) of 500 to 15 000, in particular 1000 to 10 000.

Useful monomer components (a) are preferably monoethylenically unsaturated dicarboxylic acids having 4 to 10, especially 4 to 8 and in particular 4 to 6 carbon atoms, and the anhydrides thereof and the monoesters and full esters thereof as derivatives thereof, for example maleic acid, fumaric acid, itaconic acid, mesaconic acid, methylenemalonic acid, citraconic acid, maleic anhydride, itaconic anhydride, citraconic anhydride, methylmalonic anhydride, monomethyl maleate, dimethyl maleate, monomethyl fumarate, dimethyl fumarate, monoethyl fumarate or diethyl fumarate. Suitable ester alcohols here are especially $C_1$- to $C_{20}$-alkanols, in particular $C_1$- to $C_8$-alkanols. It is also possible to use mixtures of such dicarboxylic acids or dicarboxylic anhydrides or monoesters or full esters. In a particularly preferred embodiment, the monomer component (a) used is maleic anhydride, fumaric acid or a fumaric monoester or full ester.

Useful monomer components (c) are all those monomers which are copolymerizable with monomer components (a) and (b).

In a preferred embodiment, the monomer component (c) used is a monoethylenically unsaturated $C_3$- to $C_{10}$-monocarboxylic acid or an ester, especially a $C_1$- to $C_{40}$-alkyl ester, thereof, a linear 1-olefin having 2 to 40 and especially 8 to 30 carbon atoms, styrene or a styrene derivative, a vinyl ether having a total of 3 to 40 and especially 3 to 20 carbon atoms, an allyl ether having a total of 4 to 41 and especially 4 to 21 carbon atoms, or a mixture of such comonomers.

Suitable monoethylenically unsaturated $C_3$- to $C_{10}$-monocarboxylic acids are, for example, acrylic acid, methacrylic acid, dimethacrylic acid, ethylacrylic acid, crotonic acid, allylacetic acid and vinylacetic acid, and the methyl, ethyl, n-propyl, isopropyl, n-butyl, isobutyl, sec-butyl, tert-butyl, 2-ethylhexyl, n-decyl, n-dodecyl or n-octadecyl esters thereof.

Suitable linear 1-olefins having 2 to 40 and especially 8 to 30 carbon atoms are, for example, 1-octene, 1-nonene, 1-decene, 1-undecene, 1-dodecene, 1-tetradecene, 1-hexadecene, 1-octadecene, 1-eicosene, and technical mixtures such as those of $C_{20}$-$C_{24}$-1-olefins or $C_{24}$-$C_{28}$-1-olefins.

Suitable styrene derivatives are, for example, α-methylstyrene, $C_1$- to $C_4$-alkylstyrenes such as 2-, 3- and 4-methylstyrene and 4-tert-butylstyrene, halostyrenes such as 2-, 3- or 4-chlorostyrene.

Suitable vinyl ethers having a total of 3 to 40 and especially 3 to 20 carbon atoms are especially vinyl alkyl ethers having 1 to 30 and in particular 1 to 20 carbon atoms in the alkyl radical, where the alkyl radical may bear further substituents such as hydroxyl groups, alkoxy radicals, amino groups or dialkylamino groups. Examples thereof are methyl vinyl ether, ethyl vinyl ether, n-propyl vinyl ether, isobutyl vinyl ether, 2-ethylhexyl vinyl ether, n-decyl vinyl ether, n-dodecyl vinyl ether, n-octadecyl vinyl ether, 2-(dimethylamino)ethyl vinyl ether and 2-(di-n-butylamino)ethyl vinyl ether.

Suitable allyl ethers having a total of 4 to 41 and especially 4 to 21 carbon atoms are especially allyl alkyl ethers having 1 to 30 and in particular 1 to 20 carbon atoms in the alkyl radical, where the alkyl radical may bear further substituents such as hydroxyl groups, alkoxy radicals, amino groups or dialkylamino groups. Examples thereof are methyl allyl ether, ethyl allyl ether, n-propyl allyl ether, isobutyl allyl ether, 2-ethylhexyl allyl ether, n-decyl allyl ether, n-dodecyl allyl ether, n-octadecyl allyl ether, 2-(dimethylamino)ethyl allyl ether and 2-(di-n-butylamino)ethyl allyl ether.

In addition to the monomers mentioned, it is also possible for amides and $C_1$- to $C_{40}$-alkylamides of monoethylenically unsaturated $C_3$- to $C_{10}$-monocarboxylic acids, for example acrylamide or methacrylamide, mono- and di-$C_1$- to —$C_{40}$-alkyl esters, monoamides and diamides and mono- and di-$C_1$- to —$C_{40}$-alkylamides of monoethylenically unsaturated $C_4$- to $C_{10}$-monocarboxylic acids, for example monomethyl maleate or dimethyl maleate, $C_1$- to $C_{40}$-aminoalkyl esters of monoethylenically unsaturated $C_3$- to $C_{10}$-monocarboxylic acids, for example dimethylaminoethyl acrylate, vinyl and allyl esters of saturated $C_1$- to $C_{20}$-monocarboxylic acids, for example vinyl formate, vinyl acetate, vinyl propionate, vinyl butyrate, vinyl laurate, vinyl stearate, vinyl pivalate, allyl acetate, allyl butyrate or allyl stearate, N-vinylcarboxamides of $C_1$- to $C_8$-monocarboxylic acids, for example N-vinylformamide or N-vinylacetamide, and N-vinyl derivatives of nitrogen-containing heterocycles, for example N-vinylimidazole, N-vinylmethylimidazole, N-vinylpyrrolidone or N-vinylcaprolactam, to find use as monomer components (c).

The copolymers formed from monomer components (a), (b) and (c) can in principle be prepared by all known customary polymerization processes, for example by bulk, emulsion, suspension, precipitation or solution polymerization. All polymerization processes mentioned typically work with exclusion of oxygen, preferably in a nitrogen stream. For all polymerization methods, it is possible to use customary apparatus, for example autoclaves or stirred tanks. Particular preference is given here to bulk polymerization; it can advantageously be performed at temperatures of 80 to 300° C., especially of 120 to 200° C., and the lowest polymerization temperature to be selected should be about 20° C. above the glass transition temperature of the copolymer formed. The specific polymerization conditions are appropriately selected according to the molecular weight of the copolymer to be achieved; for instance, a polymerization at relatively high temperatures gives rise to copolymers with relatively low molecular weights, whereas copolymers with relatively high molecular weight are the result at relatively low polymerization temperatures.

The copolymerization of monomer components (a), (b) and (c) is generally performed in the presence of free-radical-forming compounds. The amounts of these polymerization initiators required are typically up to 10% by weight, preferably 0.2 to 5% by weight, based on the sum of all monomers used. Suitable polymerization initiators are, for example, peroxide compounds such as tert-butyl perpivalate, tert-butyl perneodecanoate, tert-butyl perethylhexanoate, tert-butyl perisobutyrate, di-tert-butyl peroxide, di-tert-amyl peroxide, diacetyl peroxidicarbonate and dicyclohexyl peroxidicarbonate, and also azo compounds such as 2,2'-azobis(isobutyronitrile). The initiators can each be used alone or in a mixture with one another. In bulk polymerization, they are preferably introduced into the polymerization reactor separately or in the form of a solution. Monomer components (a), (b) and (c) can in principle be copolymerized at temperatures above 200° C. even in the absence of polymerization initiators.

In order to prepare relatively low molecular weight copolymers, it is often appropriate to perform the copolymerization in the presence of regulators. For this purpose it is possible to use customary regulators such as $C_1$- to $C_4$-aldehydes, formic acids and compounds comprising organic SH groups, e.g. 2-mercaptoethanol, 2-mercapto-propanol, mercaptoacetic acid or tert-butyl mercaptan. These polymerization regulators are normally used in amounts of 0.1 to 10% by weight, based on the total amount of all monomers.

In order to prepare relatively high molecular weight copolymers, it is often appropriate to work in the presence of chain extenders in the polymerization. Such chain extenders are compounds having di- or polyethylenically unsaturated groups, such as divinyl-benzene, pentaerythrityl triallyl ether, glycol diacrylate, glyceryl triacrylate or polyethylene glycol diacrylate. They can be added in the polymerization in amounts of up to 5% by weight, based on the total amount of all monomers.

The copolymerization can be performed continuously or batchwise.

On completion of free-radical copolymerization of monomer components (a), (b) and, if present, (c), some or all of the carboxylic acid or carboxylic acid derivative functions in the resulting isobutene copolymer which originate from monomer component (a) or, in the case of additional use of a carboxyl-containing monomer component (c), may also partly originate therefrom, is converted with ammonia, a mono- or polyamine, an alcohol or a mixture thereof to the corresponding derivatives, which then normally have amino and/or quaternized amino and/or amido and/or imido groups.

In a preferred embodiment, for this purpose, some or all of the carboxylic acid or carboxylic acid derivative functions in the resulting isobutene copolymer are reacted with a mono- or polyamine of the general formula $HNR^{13}R^{14}$ in which the $R^{13}$ and $R^{14}$ radicals may be the same or different and are each hydrogen, aliphatic or aromatic hydrocarbyl radicals, primary or secondary, aromatic or aliphatic aminoalkylene radicals, polyaminoalkylene radicals, hydroxylalkylene radicals, polyoxyalkylene radicals which optionally bear amino end groups, or heteroaryl or heterocyclyl radicals which optionally bear amino end groups, or, together with the nitrogen atom to which they are bonded, form a ring in which further heteroatoms may be present, and a mixture of such amines, and any resulting carboxamide or carboximide derivative may also be modified by further reaction with at least one C$_2$- to C$_{12}$-dicarboxylic anhydride, with at least one C$_2$- to C$_4$-alkylene carbonate and/or with boric acid.

The resulting carboxamide and carboximide derivatives are often, especially in the case of use in lubricant formulations, to improve the swelling behavior of elastomers incorporated, for example, into gaskets of engines, units or devices which come into contact with the derivatives mentioned or with lubricant formulations comprising them, modified with at least one C$_2$- to C$_{12}$-dicarboxylic anhydride such as maleic anhydride or phthalic anhydride, with at least one C$_2$- to C$_4$-alkylene carbonate such as ethylene carbonate or propylene carbonate and/or with boric acid.

Useful amine components, especially as those of the general formula HNR$^{13}$R$^{14}$, include:
  ammonia;
  aliphatic and aromatic, primary and secondary amines having 1 to 50 and especially 1 to 20 carbon atoms, such as methylamine, ethylamine, n-propylamine, di-n-butylamine or cyclohexylamine;
  amines in which R$^{13}$ and R$^{14}$ together with the nitrogen atom to which they are bonded form a common ring which may comprise further heteroatoms, especially nitrogen and/or oxygen and/or sulfur, such as morpholine, pyridine, piperidine, pyrrole, pyrimidine, pyrroline, pyrrolidine, pyrazine or pyridazine;
  amines which bear hydroxyalkylene and polyoxyalkylene radicals and in which R$^{13}$ and/or R$^{14}$ is a radical of the formula —(R$^{16}$—O)$_p$—H where R$^{16}$ is a C$_2$- to C$_{10}$-alkylene radical and p is an integer from 1 to 30, for example ethanolamine, 2-amino-1-propanol or neopentanolamine;
  polyoxyalkyleneamines which bear amino end groups and in which R$^{13}$ and/or R$^{14}$ is a radical of the formula —R$^{17}$—O—(R$^{16}$—O)$_p$—R$^{18}$—NR$^{19}$R$^{20}$ where R$^{16}$, R$^{17}$ and R$^{18}$ are each C$_2$- to C$_{10}$-alkylene radicals, p is as defined above, and R$^{19}$ and R$^{20}$ are each hydrogen, optionally hydroxyl- and/or amino-substituted C$_1$- to C$_{10}$-alkyl or C$_6$- to C$_{10}$-aryl, for example polyoxypropylenediamines or bis(3-aminopropyl)tetra-hydrofurans;
  polyamines in which R$^{13}$ and/or R$^{14}$ is a radical of the formula —(R$^{16}$—NR$^{19}$)$_q$—R$^{20}$ in which the R$^{16}$, R$^{19}$ and R$^{20}$ radicals are each as defined above and q is an integer from 1 to 6; useful such polyamines include: ethylenediamine, propylenediamine, dimethylaminopropylamine, diethylenetriamine, dipropylenetriamine, triethylene-tetramine, tripropylenetetramine, tetraethylenepentamine, tetrapropylene-pentamine, ethylaminoethylamine, dimethylaminoethylamine, isopropylamino-propylamine, ethylenedipropylenetetramine, 2-diisopropylaminoethylamine, aminoethylethanolamine, ethylenepropylenetriamine, N,N,N',N'-tetra-(3-amino-propyl)ethylenediamine, 2-(3-aminopropyl) cyclohexylamine, 2,5-dimethylhexane-2,5-diamine, N,N,N',N'',N''-penta-(3-aminopropyl)dipropylenetriamine, and also polyamines which comprise a heterocycle as a structural constituent, e.g. aminoethylpiperazine.

The amine components used may also be mixtures of different amines.

Compounds having quaternized amino groups are understood here to mean especially quaternized nitrogen compounds which are obtainable by addition of a compound comprising at least one oxygen- or nitrogen-containing group reactive with an anhydride and additionally at least one quaternizable amino group onto an anhydride moiety in the isobutene copolymer and subsequent quaternization, especially with an epoxide, especially in the absence of free acid, as described in EP patent application 10 168 622.8. Suitable compounds having at least one oxygen- or nitrogen-containing group reactive with an anhydride and additionally at least one quaternizable amino group are especially polyamines having at least one primary or secondary amino group and at least one tertiary amino group, such as 3-(dimethylamino)propylamine.

In a further preferred embodiment, for conversion to derivatives on completion of free-radical copolymerization of monomer components (a), (b) and, if present, (c), some or all of the carboxylic acid or carboxylic acid derivative functions in the resulting isobutene copolymer are reacted with an alcohol of the general formula R$^{15}$OH in which the R$^{15}$ radicals may be an aliphatic, cycloaliphatic or aromatic hydrocarbyl radical, a hydroxyalkylene radical, a polyoxyalkylene radical, or a mixture of such alcohols. Conversion with monohydric alcohols normally forms moieties with carboxylic ester groups in the end product, and conversion with dihydric alcohols moieties with hydroxyl groups.

Examples of such alcohols of the general formula R$^{15}$OH are methanol, ethanol, n-propanol, isopropanol, n-butanol, isobutanol, sec-butanol, tert-butanol, n-pentanol, n-hexanol, n-heptanol, n-octanol, 2-ethylhexanol, n-nonanol, isononanol, n-decanol, 2-propylheptanol, n-undecanol, n-dodecanol, n-tridecanol, isotridecanol, n-tetra-decanol, n-hexadecanol, n-octadecanol, cyclohexanol, phenol, cresols, benzyl alcohol, 1-phenylethanol, 2-phenylethanol, ethylene glycol, 1,2-propylene glycol, 1,3-propylene glycol and polyethylene glycols of the formula HO—(CH$_2$CH$_2$O)$_r$—H in which r is from 2 to 50, especially from 2 to 10, in particular from 2 to 5.

The alcohol components used may also be mixtures of different alcohols.

The conversion products of the isobutene copolymers with ammonia, a mono- or polyamine, an alcohol or a mixture thereof to the corresponding derivatives are obtained in a manner known per se by reaction of isobutene copolymers with the reactants mentioned. The molar ratio of the isobutene copolymers to the reactants mentioned depends on the number of acid or anhydride groups in the isobutene copolymer. This can be determined in a known manner, for example by titration with a strong base. In general, 0.1 to 3 equivalents of acid or anhydride groups or of the acid derivatives mentioned in the isobutene copolymer are used per mole of amine or alcohol. In general, the starting materials for the reaction are mixed and heated to 30 to 200° C. The reaction is preferably effected under a protective gas atmosphere, for example in a nitrogen stream. The reaction can be undertaken without or in inert solvents. Inert solvents suitable for this purpose include especially aliphatic and aromatic hydrocarbons, such as hexane, toluene, xylene and mineral oils. The progress of the reaction can be monitored, for example, by IR spectroscopy.

The present invention also provides novel isobutene copolymer derivatives which are obtainable by free-radical copolymerization of
(a) 10 to 90 mol %, preferably 20 to 60 mol %, especially 20 to 60 mol %, of at least one monoethylenically unsaturated C$_4$- to C$_{12}$-dicarboxylic acid or anhydride thereof,
(b) 10 to 90 mol %, preferably 10 to 70 mol %, especially 10 to 70 mol %, of a high-reactivity isobutene homopolymer having a number-average molecular weight (M$_n$) of 500 to 20 000 and a content of at least 50 mol % of terminal vinylidene double bonds per polyisobutene chain end of the general formula I $$\text{(I)}$$

in which $R^{10}$, $R^{11}$ and $R^{12}$ are each independently hydrogen, $C_1$- to $C_{20}$-alkyl, $C_5$- to $C_8$-cycloalkyl, $C_6$- to $C_{20}$-aryl, $C_7$- to $C_{20}$-alkylaryl or phenyl, where any aromatic ring may also bear one or more $C_1$- to $C_4$-alkyl or $C_1$-$C_4$-alkoxy radicals or moieties of the general formula II $$\text{(II)}$$

as substituents, where not more than one of the variables $R^{10}$, $R^{11}$ and $R^{12}$ is hydrogen and at least one of the variables $R^{10}$, $R^{11}$ and $R^{12}$ is phenyl which may also bear one or more $C_1$- to $C_4$-alkyl or $C_1$- to $C_4$-alkoxy radicals or one or two moieties of the general formula II as substituents, and n is from 8 to 350, especially 9 to 100, in particular 12 to 50, where the two or three variables n may be the same or different in the case of telechelic isobutene homopolymers I (c) 0 to 50 mol %, preferably 0 to 50 mol %, especially 1 to 50 mol %, of one or more monoethylenically unsaturated compounds which are copolymerizable with monomer components (a) and (b)

and then reacting some or all of the carboxylic acid or carboxylic acid derivative functions in the resulting isobutene copolymer with ammonia, a mono- or polyamine, an alcohol or a mixture of the reactants mentioned to form moieties with hydroxyl and/or carboxylic ester and/or amino and/or quaternized amino and/or amido and/or imido groups.

The derivatives of isobutene copolymers prepared in accordance with the invention are suitable, for example, as lubricant and fuel additives.

The derivatives of isobutene copolymers prepared in accordance with the invention are prepared from polyisobutenes having a high content of terminal vinylidene double bonds, which is usually distinctly higher than 90 mol %, and can therefore be obtained in high yields. In addition, appearance and consistency of these derivatives, for example the color thereof, are improved. In addition, the physical properties of these derivatives, especially the viscosity behavior at low temperatures, and the solubilities, especially in polar media, thermal stability and storage stability of the derivatives are also improved. The catalyst system used to obtain the polyisobutenes in the precursor is sufficiently active, long-lived, unproblematic to handle and not susceptible to faults, and is especially free of fluorine; undesired corrosion caused by the residual fluorine content on metallic materials and steel types is thus prevented.

The invention claimed is:

1. A process for preparing an isobutene copolymer derivative, the process comprising:

(I) polymerizing isobutene monomers, or a monomer mixture comprising isobutene, in the presence of an aluminum trihalide-donor complex or an alkylaluminum halide-donor complex, and in the presence of an initiator, to form a high-reactivity isobutene homopolymer or copolymer having a number-average molecular weight ($M_n$) of 110 to 250000, a content of at least 50 mol % of terminal vinylidene double bonds per polyisobutene chain end, and comprising in reacted form a structural unit corresponding to the initiator, wherein:
  each complex comprises, as the donor, an organic compound comprising an ether or a carboxylic ester function;
  a molar ratio of the donor to the aluminum trihalide, or of the donor to the alkylaluminum halide, in each complex is within a range from 0.3:1 to 1.5:1;
  the initiator is selected from the group consisting of
    an organic hydroxyl compound comprising two or more hydroxyl groups, or an organic hydroxyl compound having formula $R^5$—OH, in which $R^5$ represents a $C_6$- to $C_{20}$-alkyl radical, a $C_6$- to $C_{20}$-aryl radical, or a mixture thereof;
    an organic halogen compound comprising a halogen atom wherein each halogen atom is bound to an $sp^3$-hybridized carbon atom; and
    a protic acid,
  a molar ratio of the initiator to the isobutene monomers, or to the monomer mixture, ranges from 0.0005:1 to 0.1:1; and
  with a proviso that neither of a dihydrocarbyl ether nor 2-phenyl-2-propanol are present during the polymerizing, and with a proviso that the polymerizing (I) is not a living cationic polymerization;

(II) free-radically copolymerizing
  (a) 10 to 90 mol % of at least one monoethylenically unsaturated $C_4$- to $C_{12}$-dicarboxylic acid or an anhydride, a monoester, or a diester of the dicarboxylic acid,
  (b) 10 to 90 mol % of the high-reactivity isobutene homopolymer or copolymer, and
  (c) 0 to 50 mol % of one or more monoethylenically unsaturated compound which is copolymerizable with components (a) and (b),
to obtain an intermediate isobutene copolymer; and then (III) reacting at least a portion of the carboxylic acid, ester, or anhydride in the intermediate isobutene copolymer with at least one selected from the group consisting of
ammonia,
a monoamine or a polyamine of formula (IV):

$$HNR^{13}R^{14} \qquad \text{(IV), and}$$

an alcohol of formula (V):

$$R^{15}OH \qquad \text{(V),}$$

to form an isobutene copolymer derivative comprising at least one selected from the group consisting of a hydroxyl, a carboxylic ester, an amino, a quaternized amino, an amido, and an imido group, wherein:
$R^{13}$ and $R^{14}$ are each independently a hydrogen, an aliphatic or aromatic hydrocarbyl radical, primary or secondary, an aromatic or an aliphatic aminoalkylene radical, a polyaminoalkylene radical, a hydroxylalkylene radical, a polyoxyalkylene radical optionally comprising an amino end group, or a heteroaryl or heterocyclyl radical optionally comprising an amino end group, or $R^{13}$ and $R^{14}$ together with the nitrogen atom to which they are bonded form a ring, optionally comprising a further heteroatom; and $R^{15}$ is independently an aliphatic radical, a cycloaliphatic radical, an aromatic hydrocarbyl radical, a hydroxyalkylene radical, or a polyoxyalkylene radical.

2. The process of claim 1, wherein the polymerizing (I) carried out in the presence of an aluminum trichloride-donor complex.

3. The process of claim 1, wherein the donor is a hydrocarbyl carboxylate of formula (III):

$$R^3\text{---}COOR^4 \qquad (III),$$

wherein $R^3$ and $R^4$ are each independently a $C_1$- to $C_{20}$-alkyl radical, a $C_5$- to $C_8$-cycloalkyl radical, a $C_6$- to $C_{20}$-aryl radical, or a $C_7$- to $C_{20}$-arylalkyl radical.

4. The process of claim 1, wherein the donor has a total carbon number of 3 to 16.

5. The process of claim 1, wherein the initiator is selected from the group consisting of:

an organic hydroxyl compound comprising two or more hydroxyl groups, or an organic hydroxyl compound having formula $R^5$—OH, in which $R^5$ represents a $C_6$- to $C_{20}$-aryl radical, or a mixture thereof;

an organic halogen compound comprising a halogen atom, wherein each halogen atom is bound to an $sp^3$-hybridized carbon atom; and a protic acid.

6. The process of claim 5, wherein the initiator is at least one selected from the group consisting of a protic acid, 1-phenyl ethanol, 1-(p-methoxy phenyl)ethanol 1-phenyl-1-chloroethane, 2-phenyl-2-chloropropane, tert-butyl chloride, 1,3-bis(1-hydroxy-1-methylethyl)benzene, and 1,4-bis(1-hydroxy-1-methylethyl)benzene.

7. The process of claim 1, wherein the polymerizing (I) is carried out in the presence of 0.01 to 10 mmol of a nitrogen-comprising basic compound, based in each case on 1 mol of the isobutene monomer for a homopolymerization of isobutene or on 1 mol of a total amount of the polymerizable monomers for a copolymerization of isobutene.

8. The process of claim 7, wherein the nitrogen-comprising basic compound is pyridine or a pyridine derivative.

9. The process of claim 1, wherein the polymerizing (I) is carried out in the presence of at least one diluent selected from the group consisting of a halogenated aliphatic hydrocarbon, a halogen-free aliphatic hydrocarbon, an aromatic hydrocarbon and a mixture thereof.

10. The process of claim 1, wherein the isobutene monomers are a technical $C_4$ hydrocarbon stream having an isobutene content of 1 to 100% by weight.

11. The process of claim 1, wherein the polymerizing (I) comprises homopolymerizing isobutene or copolymerizing isobutene with up to 20% by weight of n-butene, to obtain a monofunctional high-reactivity isobutene polymer having a number-average molecular weight ($M_n$) of 500 to 5000.

12. The process of claim 1, wherein the polymerizing (I) comprises homopolymerizing isobutene or copolymerizing isobutene with up to 20% by weight of n-butene in the presence of a difunctional or trifunctional initiator, to obtain a difunctional or trifunctional high-reactivity isobutene polymer having a number-average molecular weight ($M_n$) of 500 to 10 000.

13. The process of claim 1, wherein the polymerizing (I) comprises copolymerizing isobutene with at least one vinylaromatic comonomer, and optionally with a difunctional or trifunctional initiator, to obtain a monofunctional, difunctional, or trifunctional component (b) having a number-average molecular weight ($M_n$) of 500 to 15000.

14. The process of claim 1, wherein the monomer component (a) is maleic anhydride, fumaric acid, a fumaric monoester, or a fumaric diester.

15. The process of claim 1, wherein copolymerization (II) occurs in the presence of the monomer of component (c) comprising at least one member selected from the group consisting of a monoethylenically unsaturated $C_3$- to $C_{10}$-monocarboxylic acid, an ester of the monoethylenically unsaturated $C_3$- to $C_{10}$-monocarboxylic acid, a linear 1-olefin having 2 to 40 carbon atoms, styrene, a styrene derivative, a vinyl ether having a total of 3 to 40 carbon atoms, and an allyl ether having a total of 4 to 41 carbon atoms.

16. The process of claim 1, wherein:

the intermediate isobutene copolymer is reacted with the monoamine or polyamine of the formula (IV); and any resulting carboxamide or carboximide derivative is optionally further reacted with at least one selected from the group consisting of a $C_2$- to $C_{12}$-dicarboxylic anhydride, a $C_2$- to $C_4$-alkylene carbonate, and boric acid.

17. The process of claim 1, wherein the intermediate isobutene copolymer is reacted with at least one alcohol of the formula (V).

* * * * *